(12) United States Patent
Sato

(10) Patent No.: US 11,297,274 B2
(45) Date of Patent: Apr. 5, 2022

(54) SOLID-STATE IMAGING DEVICE AND ELECTRONIC APPARATUS

(71) Applicant: SONY SEMICONDUCTOR SOLUTIONS CORPORATION, Kanagawa (JP)

(72) Inventor: Mamoru Sato, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 17/250,622

(22) PCT Filed: Aug. 16, 2019

(86) PCT No.: PCT/JP2019/032196
§ 371 (c)(1),
(2) Date: Feb. 11, 2021

(87) PCT Pub. No.: WO2020/040065
PCT Pub. Date: Feb. 27, 2020

(65) Prior Publication Data
US 2021/0218926 A1    Jul. 15, 2021

(30) Foreign Application Priority Data
Aug. 24, 2018 (JP) .............................. JP2018-157663

(51) Int. Cl.
*H04N 5/3745* (2011.01)
*H04N 5/363* (2011.01)
(Continued)

(52) U.S. Cl.
CPC ......... *H04N 5/37457* (2013.01); *H04N 5/363* (2013.01); *H04N 5/374* (2013.01); *H04N 5/378* (2013.01); *H04N 5/379* (2018.08)

(58) Field of Classification Search
CPC .. H04N 5/37457; H04N 5/3745; H04N 5/374; H04N 5/357; H04N 5/363;
(Continued)

(56) References Cited

U.S. PATENT DOCUMENTS

2008/0258047 A1* 10/2008 Sakakibara ............ H04N 5/365
                                                                    250/214 C
2016/0301886 A1* 10/2016 Muto ..................... H04N 5/378
2019/0289240 A1*  9/2019 Zhu ...................... H04N 5/3745

FOREIGN PATENT DOCUMENTS

CN      101296330 A      10/2008
CN      106060430 A      10/2016
(Continued)

OTHER PUBLICATIONS

International Search Report and Written Opinion of PCT Application No. PCT/JP2019/032196, dated Nov. 5, 2019, 09 pages of ISRWO.

*Primary Examiner* — Twyler L Haskins
*Assistant Examiner* — Akshay Trehan
(74) *Attorney, Agent, or Firm* — Chip Law Group

(57) ABSTRACT

To suppress deterioration of image quality. A solid-state imaging device (1) according to an embodiment includes a first vertical signal line (VSL0k) and a second vertical signal line (VSL1k), a current mirror circuit (141) connected to the first and the second vertical signal lines, a first unit pixel (11*i*) connected to the first vertical signal line, a second unit pixel (11*i*+1) connected to the second vertical signal line, a first unit cell (11D0) connected to the first vertical signal line, a second unit cell (11D1) connected to the second vertical signal line, a current supply line (VCOM) connected to the first and the second unit pixels and the first and the second unit cells, and a constant current circuit (142) connected to the current supply line. A first amplification transistor of the first unit pixel, a second amplification (Continued)

transistor of the second unit pixel, the current mirror circuit, and the constant current circuit constitute a first differential amplifier circuit, and a third amplification transistor of the first unit cell, a fourth amplification transistor of the second unit cell, the current mirror circuit, and the constant current circuit constitute a second differential amplifier circuit.

20 Claims, 25 Drawing Sheets

(51) Int. Cl.
    *H04N 5/369*     (2011.01)
    *H04N 5/374*     (2011.01)
    *H04N 5/378*     (2011.01)

(58) Field of Classification Search
    CPC ........ H04N 5/369; H04N 5/378; H04N 5/379; H04N 5/3696; H04N 5/36963

USPC .......................................... 348/245, 300–301
See application file for complete search history.

(56) References Cited

FOREIGN PATENT DOCUMENTS

| | | |
|---|---|---|
| CN | 109845243 A | 6/2019 |
| DE | 102016106268 A1 | 10/2016 |
| GB | 2538854 A | 11/2016 |
| JP | 2008-271280 A | 11/2008 |
| JP | 2016-201649 A | 12/2016 |
| JP | 2018-074268 A | 5/2018 |
| KR | 10-2008-0095175 A | 10/2008 |
| WO | 2018/079330 A1 | 5/2018 |

\* cited by examiner

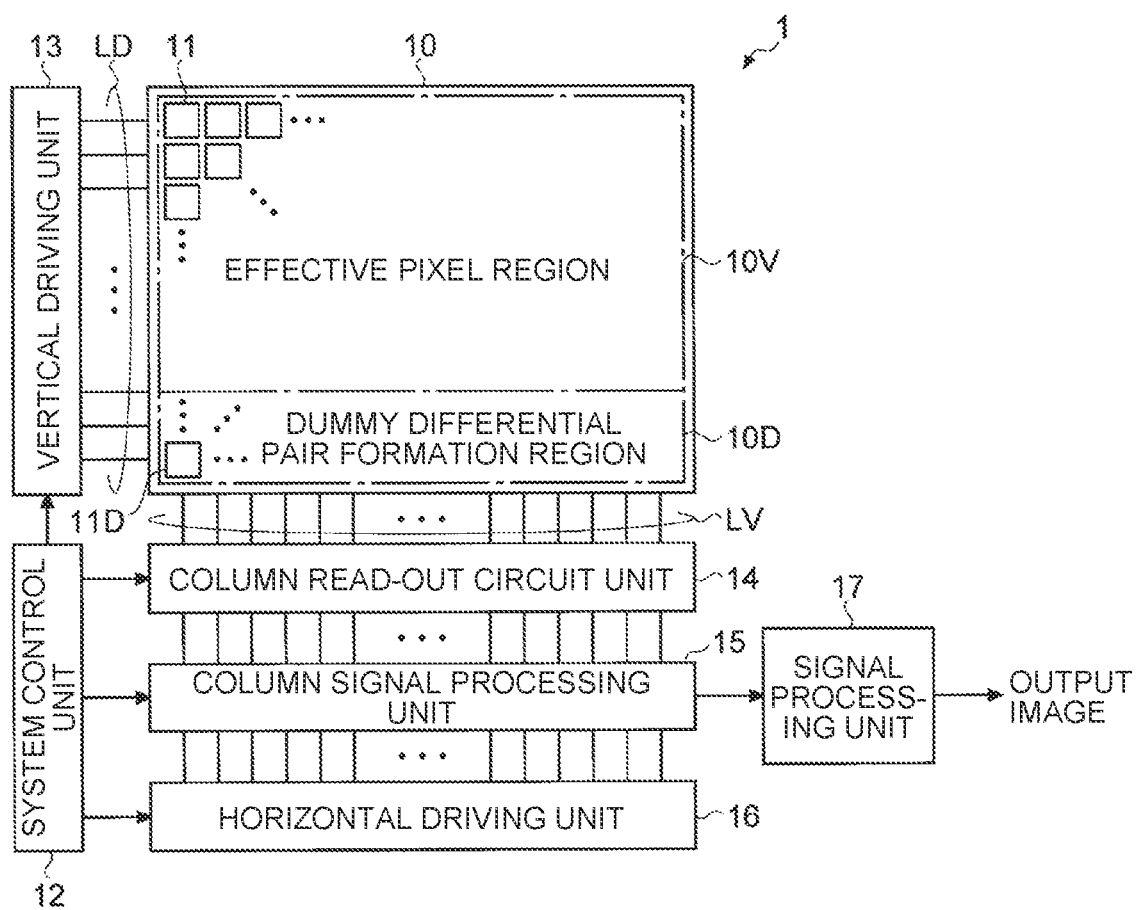

SOLID-STATE IMAGING DEVICE AND ELECTRONIC APPARATUS

CROSS REFERENCE TO RELATED APPLICATIONS

This application is a U.S. National Phase of International Patent Application No. PCT/JP2019/032196 filed on Aug. 16, 2019, which claims priority benefit of Japanese Patent Application No. JP 2018-157663 filed in the Japan Patent Office on Aug. 24, 2018. Each of the above-referenced applications is hereby incorporated herein by reference in its entirety.

FIELD

The present disclosure relates to a solid-state imaging device and an electronic apparatus.

BACKGROUND

In a complementary metal oxide semiconductor (CMOS) type of solid-state imaging device (hereinafter, referred to as a CMOS image sensor, or simply referred to as an image sensor), a signal charge generated in a photoelectron conversion unit (light receiving unit) is converted into a voltage in a floating diffusion region (floating diffusion: FD). The voltage converted in the FD is read out as an output voltage (also referred to as a pixel signal) via a source follower circuit constituted of an amplification transistor.

Assuming that signal detection capacitance is C and a signal charge amount corresponding to a light receiving signal is Q, an output voltage V of a pixel is given by V=Q/C. Thus, if the signal detection capacitance C is small, the output voltage V can be increased, that is, sensitivity can be raised.

Thus, in the related art, a high-sensitivity signal output has been implemented by configuring a pixel with a photoelectric conversion element the one end of which is grounded, a source-grounding type amplification transistor in which a gate electrode is connected to the other end of the photoelectric conversion element, a source electrode is grounded, and a drain electrode is connected to a load circuit, a capacitive element connected between the drain electrode and the gate electrode of the amplification transistor, and a reset transistor connected to the capacitive element in parallel, and reducing capacitance of the capacitive element.

CITATION LIST

Patent Literature

Patent Literature 1: Japanese Patent Application Laid-open No. 2008-271280

SUMMARY

Technical Problem

However, as pixels have been further micronized in recent years, it has become more difficult to obtain a signal voltage having a sufficient voltage value from individual pixels. When the output voltage is small, a ratio of noise components occupying the output voltage is increased, and as a result, a problem is caused such that image quality is deteriorated because an output image is affected by a noise.

Thus, the present disclosure provides a solid-state imaging device and an electronic apparatus that can suppress deterioration of the image quality.

Solution to Problem

To solve the above-described problem, A solid-state imaging device according to one aspect of the present disclosure comprises: a first vertical signal line and a second vertical signal line; a current mirror circuit connected to the first and the second vertical signal lines; a first unit pixel connected to the first vertical signal line; a second unit pixel connected to the second vertical signal line; a first unit cell connected to the first vertical signal line; a second unit cell connected to the second vertical signal line; a current supply line connected to the first and the second unit pixels and the first and the second unit cells; and a constant current circuit connected to the current supply line, wherein a first amplification transistor of the first unit pixel, a second amplification transistor of the second unit pixel, the current mirror circuit, and the constant current circuit constitute a first differential amplifier circuit, and a third amplification transistor of the first unit cell, a fourth amplification transistor of the second unit cell, the current mirror circuit, and the constant current circuit constitute a second differential amplifier circuit.

(Function) With the solid-state imaging device according to one embodiment of the present disclosure, a differential amplifier circuit is formed of the third and the fourth amplification transistors of the first and the second unit cells, the current mirror circuit, and the constant current circuit, so that a current path of a differential pair constituting a differential-type amplification read-out configuration can be prevented from being eliminated. Due to this, current consumption can be maintained, so that a drop amount or an increase amount of a power supply voltage VDD and a ground voltage is reduced, and it is possible to prevent a settling time of the first or the second vertical signal line from being prolonged.

At the time when an electric charge is transferred from a photoelectric conversion element to a charge accumulation unit in the first or the second unit pixel, the first and the second vertical signal lines are separated from the first and the second unit pixels, and a voltage level of the first and the second vertical signal lines is maintained at a reset level, so that a large amplitude can be prevented from being generated in the first and the second vertical signal lines because of feedthrough (a phenomenon such that the floating diffusion is amplified via a capacitive coupling at the time when a gate of a transfer transistor makes transition from Low level to High level) caused by the capacitive coupling of the transfer transistor and the charge accumulation unit, and it is possible to prevent the settling time of the first and the second vertical signal lines from being prolonged accordingly.

BRIEF DESCRIPTION OF DRAWINGS

FIG. 6 is a system configuration diagram illustrating a schematic configuration example of the CMOS image sensor as a solid-state imaging device mounted on an electronic apparatus according to a first embodiment.

DESCRIPTION OF EMBODIMENTS

Figure 1:
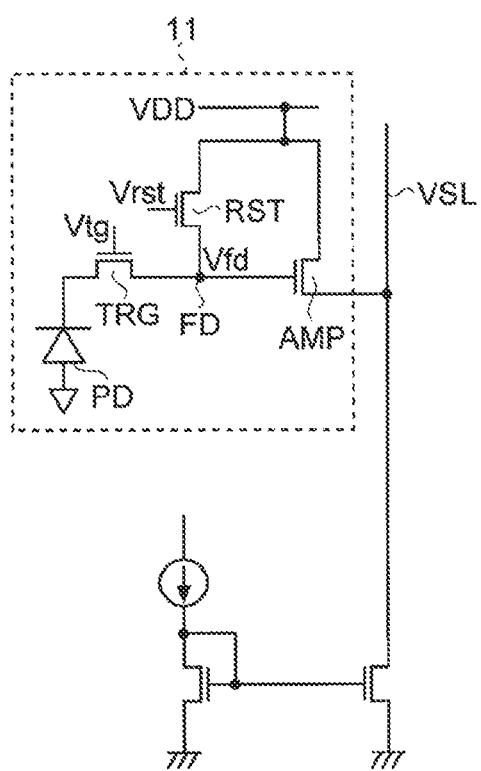
FIG. 1 is a circuit diagram illustrating a schematic configuration example of a CMOS image sensor.

The following describes embodiments of the present disclosure in detail based on the drawings. In the following embodiments, the same part is denoted by the same reference numeral, and redundant description will not be repeated.

The present disclosure will be explained in order of items described below.

1. Introduction
2. First embodiment
2.1 System configuration example of CMOS image sensor
2.2 Circuit configuration example of unit pixel
2.3 Circuit configuration example of dummy cell
2.4 Basic function example of unit pixel
2.5 Example of differential-type amplification read-out configuration
2.6 Example of peripheral circuit of differential-type amplification read-out configuration
2.7 Combination example of unit pixels forming differential-type amplification read-out configuration
2.8 Driving example of differential-type amplification read-out configuration
2.9 Driving example at time of differential-type amplification read-out (switching between read-out pixel and reference pixel)
2.10 Function and effect
3. Second embodiment
3.1 Combination example of unit pixels forming differential-type amplification read-out configuration
3.2 Example of peripheral circuit of differential-type amplification read-out configuration
3.3 Driving example at time of differential-type amplification read-out (switching between read-out pixel and reference pixel)
3.4 Function and effect
3.5 Modification
4. Third embodiment
4.1 Example of peripheral circuit of differential-type amplification read-out configuration
4.2 Driving example at time of differential-type amplification read-out (switching between read-out pixel and reference pixel)
4.3 Function and effect
4.4 Modification
5. Fourth embodiment
5.1 Example of peripheral circuit of differential-type amplification read-out configuration 6. Fifth embodiment
6.1 System configuration example of CMOS image sensor
6.2 Example of peripheral circuit of differential-type amplification read-out configuration
7. Additional notes
7.1 Cross-sectional structure example of unit pixel
7.1.1 First example
7.1.2 Second example
7.2 Structure example of CMOS image sensor
7.2.1 First example
7.2.2 Second example

1. Introduction

In a typical CMOS image sensor, as illustrated in FIG. 1, a unit pixel 11 is configured by using a photodiode PD as a photoelectric conversion element, a floating diffusion region (floating diffusion) FD that converts an electron generated in the photodiode PD into a voltage, and an amplification transistor AMP using the voltage of the floating diffusion FD as a gate input. The floating diffusion region (floating diffusion) FD is also called a charge accumulation unit.

An analog output voltage (pixel signal) is read out from each unit pixel 11 via a source follower circuit constituted of the amplification transistor AMP (hereinafter, referred to as a source follower read-out configuration), and converted (Analog to Digital (AD)-converted) into a digital voltage value.

On the other hand, as a configuration of reading out the pixel signal from the unit pixel 11, there is a configuration in which a differential-type amplifier circuit (hereinafter, simply referred to as a differential amplifier circuit) is constituted of two unit pixels 11 to read out the pixel signal via the differential amplifier circuit (hereinafter, referred to as a differential-type amplification read-out configuration) in addition to the source follower read-out configuration.

The electron generated in the photodiode PD is converted into a voltage at voltage conversion efficiency ($\mu V/e^-$) per electron corresponding to parasitic capacitance of a node constituting the floating diffusion FD. A voltage amplitude $\Delta Vfd$ of the floating diffusion FD corresponding to the number of signal electrons is read out from each unit pixel 11 via the amplification transistor AMP. At this point, a noise is superimposed on the read-out pixel signal.

Examples of main generation sources of the noise include a pixel noise Vn_pix ($\mu V$ (microvolt) rms) generated by the amplification transistor AMP in the unit pixel 11, an AFE noise Vn_afe ($\mu Vrms$) generated by an analog circuit (Analog Front End: AFE) such as a circuit that amplifies a voltage that is read out from each unit pixel 11 via a vertical signal line VSL, and an ADC noise Vn_adc ($\mu Vrms$) generated by an AD conversion circuit (ADC).

Figure 2:
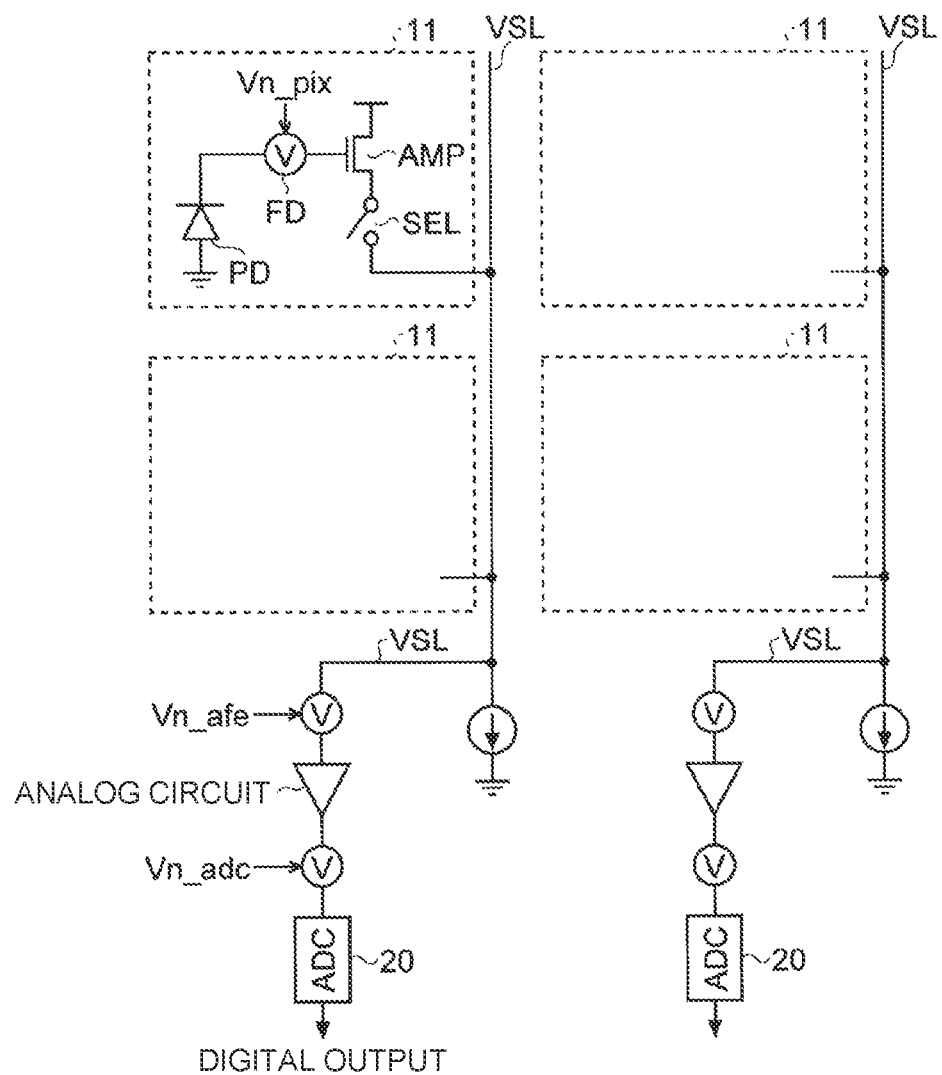
FIG. 2 is a diagram for explaining a noise generated in the CMOS image sensor.

In the following description, as illustrated in FIG. 2, a noise input-converted into a voltage noise generated in the floating diffusion FD is defined as the pixel noise Vn_pix, a noise converted into a voltage noise generated in the vertical signal line VSL is defined as the AFE noise Vn_afe, and a noise converted into a noise generated at an input node of an ADC 20 is defined as the ADC noise Vn_adc.

In the source follower read-out configuration, gain Asf of a voltage amplitude $\Delta Vvs1$ of the vertical signal line VSL with respect to a voltage amplitude $\Delta Vfd$ of the floating diffusion FD is obtained by $\Delta Vvs1=Asf\times\Delta Vfd$, and a value thereof is about 0.8 to 1.0 times. In a case in which conversion efficiency ($\mu V/e^-$) of electron-voltage conversion in the floating diffusion FD is assumed to be $\eta fd$, that is, in a case in which conversion efficiency ($\mu V/e^-$) of electron-voltage conversion in the vertical signal line VSL is assumed to be $\eta vs1$, $\eta vs1=Asf\times\eta fd$ is satisfied.

In this case, assuming that the number of electrons of a signal read out from the photodiode PD (also referred to as a signal electron number) is Nsig_e, $\Delta Vvs1=\eta vs1\times Nsig\_e=\eta fd\times Asf\times Nsig\_e$ can be established. For simplicity, assuming that the voltage is not amplified by the AFE, that is, the gain is 1 time, when a noise superimposed on an output of the ADC 20 is converted into a voltage noise generated in the vertical signal line VSL as Vn_total ($\mu Vrms$), a total noise Vn_total is the sum of the ADC noise Vn_adc, the AFE noise Vn_afe, and a noise Afd×Vn_pix (square-arithmetic mean). This represents that the total noise Vn_total is superimposed on the voltage amplitude $\Delta Vvs1$ of the vertical signal line VSL based on the signal electron number Nsig_e. Afd is gain of the floating diffusion FD.

From the viewpoint of image quality, what amount of noise is superimposed on a certain signal electron number Nsig_e is important. When the total noise Vn_total is converted into the number of electrons in the floating diffusion FD (unit: $e^-$ rms), the number of electrons Vn_total_e of the total noise Vn_total is represented by the following expression (1).

$$Vn\_total\_e = \sqrt{(Vn\_adc/\eta vsl)^2 + (Vn\_afe/\eta vsl)^2 + (Vn\_pix/\eta fd)^2} \quad (1)$$

In the expression (1), $\eta vs1=Asf\times\eta fd$ is established, so that it can be found that influence of the ADC noise Vn_adc and the AFE noise Vn_afe can be reduced by increasing the gain Asf, and influence of the ADC noise Vn_adc, the AFE noise Vn_afe, and the pixel noise Vn_pix can be reduced by increasing the conversion efficiency $\eta fd$.

As described above, the gain Asf is voltage gain of the source follower circuit, typically 0.8 to 1.0, and theoretically equal to or smaller than 1.0. Thus, it is difficult to improve the gain Asf. On the other hand, the conversion efficiency $\eta fd$ is determined based on the sum total Cfd of parasitic capacitance viewed from the floating diffusion FD, and $\eta fd=e/Cfd$ is established. e represents a quantum of electrons, and is a constant of $1.602\times10^{-19}$ coulomb.

Figure 3A:
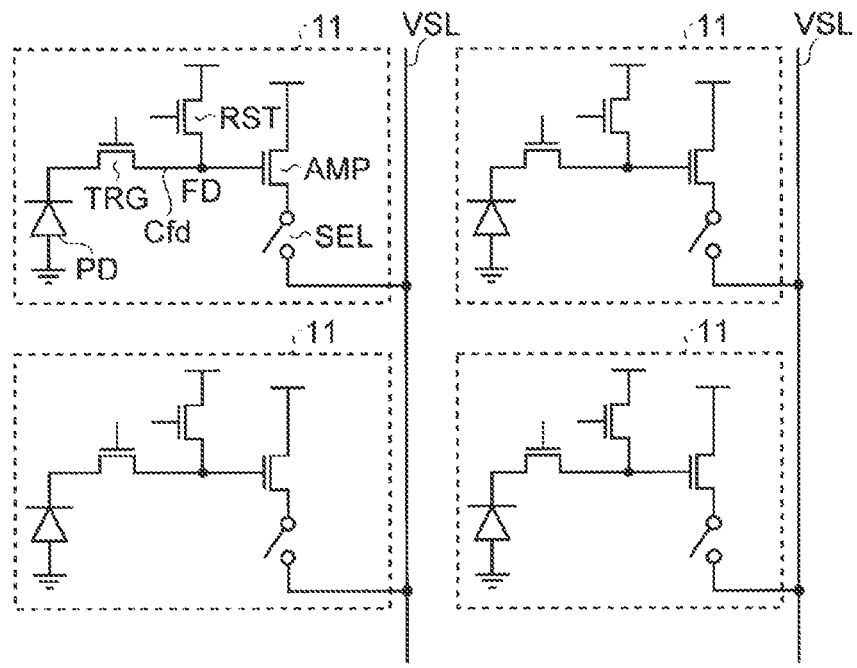
FIG. 3A is a diagram illustrating an arrangement example of a unit pixel in the CMOS image sensor.
Figure 3B:
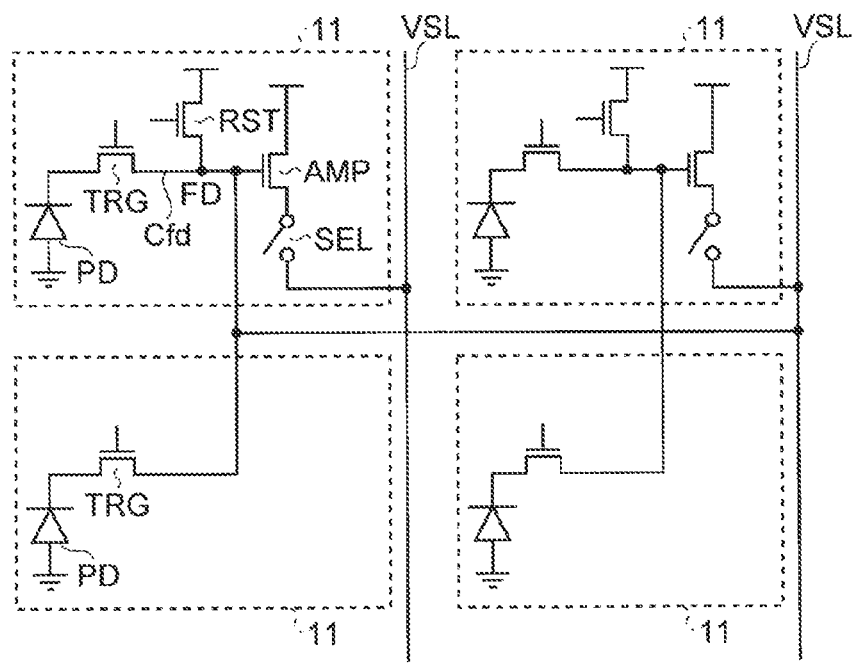
FIG. 3B is a diagram illustrating a configuration example in a case in which a plurality of unit pixels share a transistor in the CMOS image sensor.

There is a physical limit to capacitance reduction for reducing noises. As illustrated in FIGS. 3A and 3B, in a case of employing a structure of sharing a transistor (for example, a reset transistor RST or the amplification transistor AMP) among a plurality of the unit pixels 11 to reduce a pitch of the unit pixels 11 (hereinafter, referred to as a pixel pitch), the parasitic capacitance Cfd of the floating diffusion FD is increased along with extension of wiring from a plurality of transfer transistors TRG to the amplification transistor AMP of sharing pixels, and it becomes more difficult to increase the conversion efficiency $\eta fd$.

As described above, the gain Asf is about 1 time in the source follower read-out configuration, so that, when the conversion efficiency $\eta fd$ cannot be increased because the unit pixel 11 is micronized, there is the problem that the conversion efficiency $\eta vs1$ cannot be designed to be large, and the noises cannot be reduced.

On the other hand, in the differential-type amplification read-out configuration, gain Adif of the voltage amplitude $\Delta Vvs1$ of the vertical signal line VSL is determined based on parasitic capacitance Cgd with respect to the vertical signal line VSL as part of the parasitic capacitance Cfd of the floating diffusion FD. The parasitic capacitance Cgd may include not only the parasitic capacitance of the amplification transistor AMP but also capacitance that is intentionally added by wiring capacitance and the like to adjust the gain Adif.

In a case in which open loop gain of the differential amplifier circuit in the differential-type amplification read-out configuration is assumed to be −Av, ηvs1=e/{Cgd+Cfd/−Av} is established. Similarly, when a total noise in the differential-type amplification read-out configuration is converted into the number of electrons in the floating diffusion FD, the number of electrons Vn_total_e of the total noise Vn_total is represented by the following expression (2).

$$Vn\_total\_e = \sqrt{(Vn\_adc/\eta vsl)^2 + (Vn\_afe/\eta vsl)^2 + (Vn\_pix/\eta fd)^2} \quad (2)$$

As is clear from the expression (2), the noise can be reduced by increasing the conversion efficiency ηvs1 and ηfd also in the differential-type amplification read-out configuration.

Based on a comparison between the expression (1) of the source follower read-out configuration and the expression (2) of the differential-type amplification read-out configuration, regarding the ADC noise Vn_adc and the AFE noise Vn_afe, the conversion efficiency ηvs1 in the expression (1) is Asf×ηfd and the gain Asf is 1.0 at the maximum, so that ηvs1≤ηfd=e/Cfd is established. Thus, the conversion efficiency ηvs1 cannot be increased in a situation in which the parasitic capacitance Cfd is difficult to be reduced.

Figure 4:
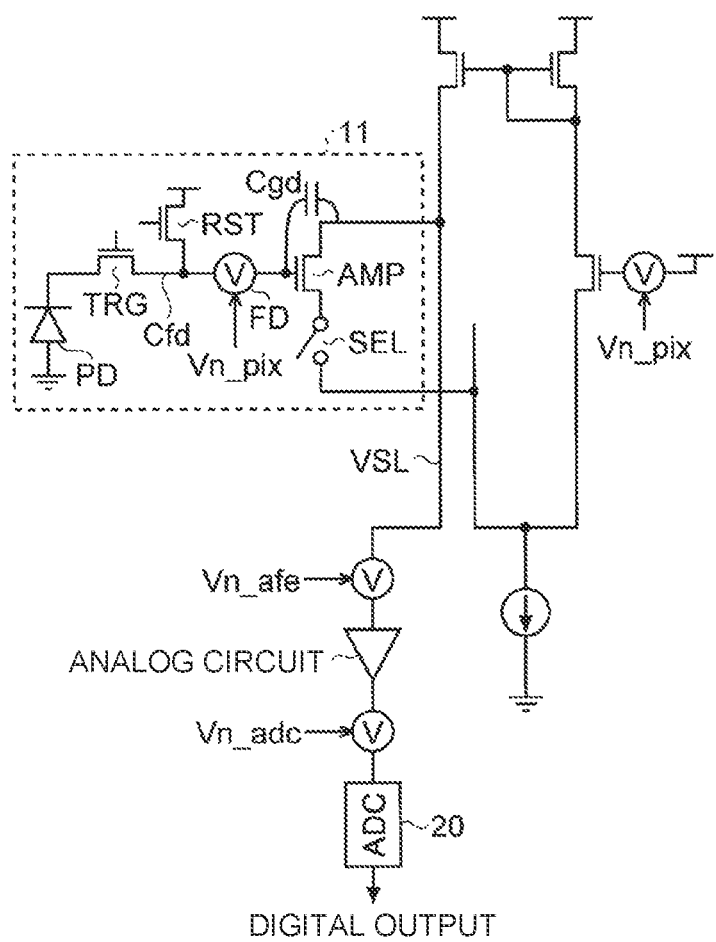
FIG. 4 is a diagram for explaining capacitance parasitic to an amplification transistor in the CMOS image sensor.

On the other hand, regarding the conversion efficiency ηvs1 of the expression (2), e/{Cgd+Cfd/Av} is established and the open loop gain −Av is typically about several tens to hundreds, so that influence of the parasitic capacitance Cfd can be suppressed, and ηvs1≈e/Cgd is established accordingly. The parasitic capacitance Cgd is part of the parasitic capacitance Cfd, so that the parasitic capacitance Cgd is a smaller value than the parasitic capacitance Cfd. Additionally, as illustrated in FIG. 4, the parasitic capacitance Cgd is capacitance parasitic to the amplification transistor AMP, so that even in a case of employing a structure in which the unit pixels 11 share the amplification transistor AMP, the capacitance is not prevented from being reduced. That is, the conversion efficiency ηvs1 can be a larger value in the differential-type amplification read-out configuration. This indicates that the differential-type amplification read-out configuration has an advantage over the source follower read-out configuration from the viewpoint of noise reduction.

However, the differential-type amplification read-out configuration has a larger output impedance of the amplification transistor in the pixel than that of the source follower read-out configuration, so that a settling (also referred to as settling) period of the vertical signal line VSL is prolonged.

Figure 5A:
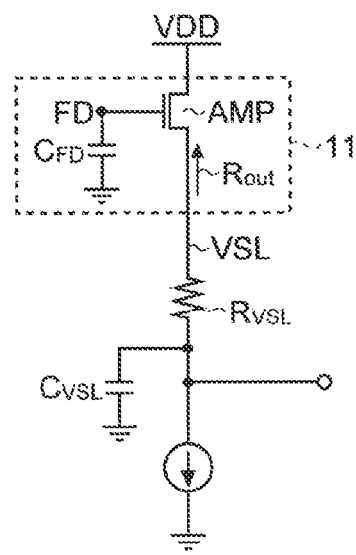
FIG. 5A is a circuit diagram illustrating an example of a source follower read-out configuration.
Figure 5B:
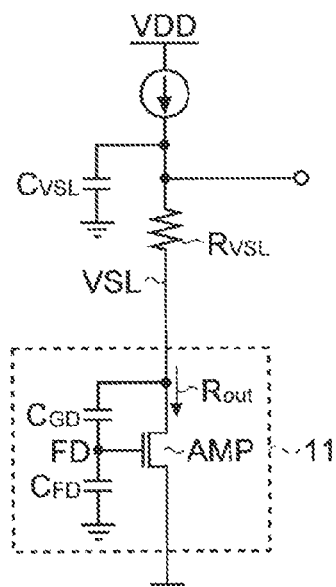
FIG. 5B is a circuit diagram illustrating an example of a differential-type amplification read-out configuration.

FIG. 5A illustrates an example of the source follower read-out configuration, FIG. 5B illustrates an example of the differential-type amplification read-out configuration, and output impedances thereof will be described using these drawings. In the source follower read-out configuration illustrated in FIG. 5A, the output impedance of the amplification transistor AMP in the unit pixel 11 is represented by the following expression (3).

$$R_{out} \approx \frac{1}{gm} \quad (3)$$

On the other hand, in a differential-type amplification read-out configuration illustrated in FIG. 5B, the amplification transistor AMP is used as a source grounding-type amplifier, so that the output impedance thereof is represented by the following expression (4). In the expression (4), "//" means parallel resistance.

$$R_{out} \approx \frac{1}{gm\left(\frac{C_{dg}}{C_{dg} + C_{dg}}\right)} // \frac{1}{gds} \quad (4)$$

In the expression (3) and expression (4), gm indicates a value obtained by dividing a variation of a drain current Rout by a variation of a gate-source voltage, gds indicates a drain conductance of the amplification transistor AMP, CGD indicates feedback capacitance between the gate and the drain of the amplification transistor AMP, and CFD indicates parasitic capacitance (corresponding to the floating diffusion FD) of a node connected to the gate of the amplification transistor AMP. In FIGS. 5A and 5B, RVSL indicates wiring resistance of the vertical signal line VSL, and CVSL indicates parasitic capacitance of the vertical signal line VSL.

As is clear from the expression (3) and the expression (4), the output impedance of the differential-type amplification read-out configuration is several times larger than the output impedance of the source follower read-out configuration. In this case, the settling period of the vertical signal line VSL is determined based on an RC time constant of the vertical signal line VSL. Thus, the settling time is delayed in the differential-type amplification read-out configuration as compared with a case of the source follower read-out configuration. As a result, in the differential-type amplification read-out configuration, there has been the problem that the settling period of the vertical signal line VSL longer than usual is generated at the time of causing a row (hereinafter, referred to as a read-out pixel row or a signal pixel row) of a unit pixel to be read out (hereinafter, referred to as a read-out pixel or a signal pixel) to make transition to the next read-out pixel row, or immediately after the time when an electric charge is transferred from the photodiode PD to the floating diffusion FD in each of the unit pixels 11, and a read-out time is prolonged and a frame rate is lowered accordingly.

At the time of causing the read-out pixel row to make transition to the next read-out pixel row (for example, from the i-th row to the (i+1)-th row), selection transistors SEL of all the unit pixels 11 are caused to be in an OFF state, and a current path of a differential pair constituting the differential-type amplification read-out configuration is eliminated, so that a current that lost a flow-out destination remains in the vertical signal line VSL, and the settling period of the vertical signal line VSL is prolonged accordingly.

At the time of transferring the electric charge from the photodiode PD to the floating diffusion FD in each of the unit pixels 11, the floating diffusion FD as an inverting input (also referred to as -input) of the differential pair is boosted and current balance of the differential pair collapses, so that the settling period of the vertical signal line VSL is prolonged.

Thus, the following embodiment describes, using examples, a solid-state imaging device and an electronic apparatus that can suppress lowering of the frame rate caused by a prolonged settling period of the vertical signal line VSL even in a case of employing the differential-type amplification read-out configuration to suppress deterioration of image quality.

2. First Embodiment

Next, the following describes the solid-state imaging device and the electronic apparatus according to the first embodiment of the present disclosure in detail with reference to the drawings.

2.1 System Configuration Example of CMOS Image Sensor

FIG. 6 is a system configuration diagram illustrating a schematic configuration example of the CMOS image sensor as the solid-state imaging device mounted on the electronic apparatus according to the present embodiment. As illustrated in FIG. 6, a CMOS image sensor 1 includes a pixel array unit 10, a vertical driving unit 13, a column read-out circuit unit 14, a column signal processing unit 15, a horizontal driving unit 16, a system control unit 12, and a signal processing unit 17. The pixel array unit 10, the vertical driving unit 13, the column read-out circuit unit 14, the column signal processing unit 15, the horizontal driving unit 16, the system control unit 12, and the signal processing unit 17 are disposed on the same semiconductor substrate (chip) or a plurality of laminated semiconductor substrates (chip) that are electrically connected to each other.

The pixel array unit 10 includes an effective pixel region 10V in which effective unit pixels (hereinafter, referred to as unit pixels) 11 are two-dimensionally arranged in a matrix, the unit pixel 11 including a photoelectric conversion element (photodiode PD) that can photoelectrically convert a charge amount corresponding to an incident light quantity to be accumulated therein and output as a signal. The pixel array unit 10 may include a region in which a light-shielding unit pixel and the like are arranged in a row and/or column shape in addition to the unit pixel 11, the light-shielding unit pixel in which light incident from the outside is shielded by shielding a light receiving surface from light. For example, the light-shielding unit pixel may have the same configuration as that of the effective unit pixel 11 except the structure in which the light receiving surface is shielded from light.

In the following description, an optical charge having a charge amount corresponding to the incident light quantity may be simply referred to as an "electric charge", and the unit pixel 11 may be simply referred to as a "pixel".

Additionally, the pixel array unit 10 includes, for example, a dummy differential pair formation region 10D in which cells (hereinafter, referred to as dummy cells or unit cells) 11D having the same configuration as that of the unit pixel 11 without the photodiode PD and the transfer transistor TRG are arranged in a row and/or column shape in addition to an effective pixel region 11V.

In the pixel array unit 10, a pixel driving line LD is formed for each row of the pixel array in a matrix (including the dummy cell 11D) along a horizontal direction of the drawing (an arrangement direction of the pixels in a pixel row), and vertical pixel wiring LV is formed for each column along a vertical direction of the drawing (an arrangement direction of the pixels in a pixel column). One end of the pixel driving line LD is connected to an output end of the vertical driving unit 13 corresponding to each row.

The column read-out circuit unit 14 includes at least a circuit that supplies a constant current for each column to the unit pixel 11 or the dummy cell 11D in a selected row within the pixel array unit 10, a current mirror circuit, a changeover switch for the unit pixel 11 to be read out and the dummy cell 11D, and the like, constitutes the differential amplifier circuit (differential pair) together with the transistor of the unit pixel 11 and/or the dummy cell 11D in the pixel array unit 10, and converts an optical charge signal into a voltage signal (also referred to as a pixel signal) to be output to the vertical pixel wiring LV.

The vertical driving unit 13 includes a shift register, an address decoder, and the like, and drives the unit pixels 11 and the dummy cells 11D in the pixel array unit 10 all at the same time, or row by row, for example. A specific configuration of the vertical driving unit 13 is not illustrated, but the vertical driving unit 13 has a configuration including a read-out scanning system, and a sweep scanning system or a batch sweep and batch transfer system.

The read-out scanning system selectively scans the unit pixels 11 of the pixel array unit 10 row by row to read out the pixel signal from the unit pixel 11. In a case of row driving (a rolling shutter operation), regarding a sweep, sweep scanning is performed on a read-out row on which read-out scanning is performed by the read-out scanning system preceding the read-out scanning corresponding to a time of shutter speed. In a case of global exposure (a global shutter operation), a batch sweep is performed preceding batch transfer corresponding to a time of shutter speed. Due to such a sweep, unnecessary electric charges are swept (reset) from the photodiode PD of the unit pixel 11 in the read-out row. Due to the sweep (reset) of the unnecessary electric charges, what is called an electronic shutter operation is performed.

In this case, the electronic shutter operation means an operation of discarding unnecessary optical charges that are accumulated in the photodiode PD immediately before the operation and newly starting exposure (starting accumulation of optical charges).

The signal that is read out through a read-out operation performed by the read-out scanning system corresponds to an amount of light that is incident after a preceding read-out operation or the electronic shutter operation. In a case of row driving, a period from a read-out timing by the preceding read-out operation or a sweep timing by the electronic shutter operation to a read-out timing by the present read-out operation becomes an accumulation time (exposure time) for the optical charge in the unit pixel 11. In a case of global exposure, a time from a batch sweep to batch transfer becomes the accumulation time (exposure time).

The pixel signal output from each of the unit pixels 11 in the pixel row that is selectively scanned by the vertical driving unit 13 is supplied to the column signal processing unit 15 through each piece of the vertical pixel wiring LV. The column signal processing unit 15 performs predetermined signal processing on the pixel signal output from each of the unit pixels 11 in the selected row via the vertical pixel wiring LV for each pixel column of the pixel array unit 10, and temporarily holds the pixel signal after the signal processing.

Specifically, the column signal processing unit 15 performs at least noise removal processing, for example, correlated double sampling (CDS) processing as the signal processing. Through the CDS performed by the column signal processing unit 15, fixed pattern noises specific to the pixel such as reset noises and threshold variations of the amplification transistor AMP are removed. The column signal processing unit 15 can also be configured to have an AD conversion function in addition to the noise removal processing, for example, and to output the pixel signal as a digital signal.

The horizontal driving unit 16 includes a shift register, an address decoder, and the like, and selects a unit circuit corresponding to the pixel column of the column signal processing unit 15 in order. Through selective scanning performed by the horizontal driving unit 16, the pixel signal on which signal processing is performed by the column signal processing unit 15 is output to the signal processing unit 17 in order.

The system control unit 12 includes a timing generator and the like that generate various timing signals, and performs driving control on the vertical driving unit 13, the column signal processing unit 15, the horizontal driving unit 16, and the like based on the various timing signals generated by the timing generator.

The CMOS image sensor 1 further includes the signal processing unit 17 and a data storage unit (not illustrated). The signal processing unit 17 has at least an addition processing function, and performs various kinds of signal processing such as addition processing on the pixel signal output from the column signal processing unit 15. In the signal processing performed by the signal processing unit 17, the data storage unit temporarily stores data required for the processing. The signal processing unit 17 and the data storage unit may be external signal processing units disposed on a substrate different from that of the CMOS image sensor 1, for example, the processing may be performed by a digital signal processor (DSP) or software, or the signal processing unit 17 and the data storage unit may be mounted on the same substrate as that of the CMOS image sensor 1.

2.2 Circuit Configuration Example of Unit Pixel

Next, the following describes a circuit configuration example of the unit pixels 11 disposed in the effective pixel region 10V of the pixel array unit 10 in FIG. 6 in a matrix.

Figure 7:
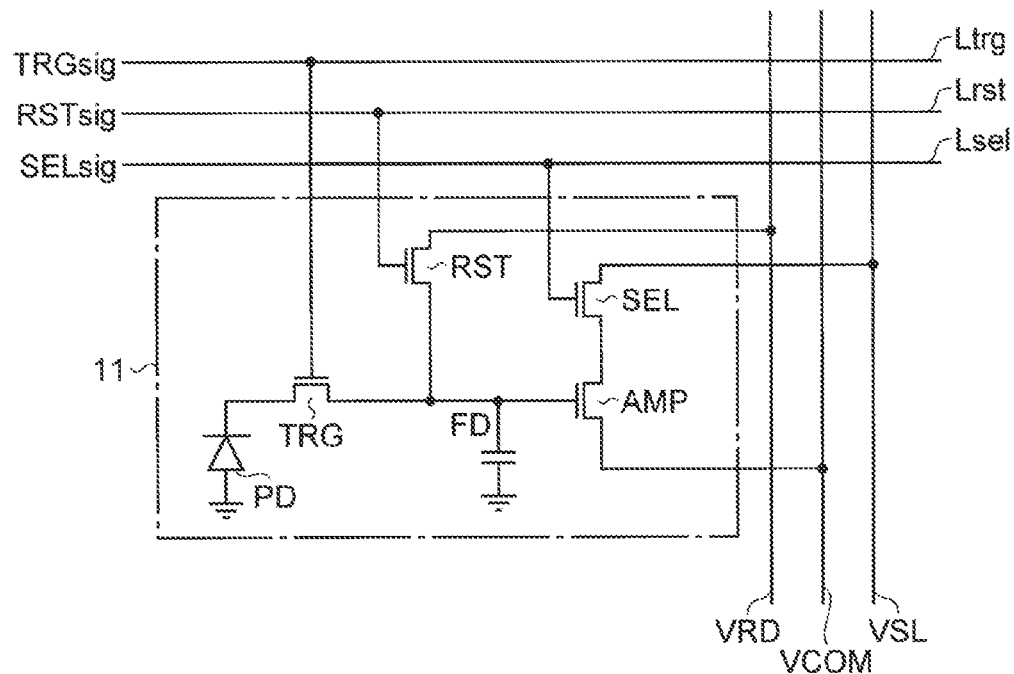
FIG. 7 is a circuit diagram illustrating a schematic configuration example of a unit pixel in an effective pixel region according to the first embodiment.

FIG. 7 is a circuit diagram illustrating a schematic configuration example of the unit pixel in the effective pixel region according to the present embodiment. As illustrated in FIG. 7, the unit pixel 11 is constituted of the photodiode PD, the transfer transistor TRG, the floating diffusion FD, the reset transistor RST, the amplification transistor AMP, a selection transistor SEL, a selection transistor driving line Lsel serving as the pixel driving line LD the one end of which is connected to the vertical driving unit 13, a reset transistor driving line Lrst, a transfer transistor driving line Ltrg, the vertical signal line VSL serving as the vertical pixel wiring LV the one end of which is connected to the column read-out circuit unit 14, a vertical reset input line VRD, and a vertical current supply line VCOM.

The photodiode PD photoelectrically converts incident light. The transfer transistor TRG transfers an electric charge generated in the photodiode PD. The floating diffusion FD accumulates the electric charge transferred by the transfer transistor TRG. The amplification transistor AMP causes a pixel signal having a voltage corresponding to the electric charge accumulated in the floating diffusion FD to appear in the vertical signal line VSL. The reset transistor RST discharges the electric charge accumulated in the floating diffusion FD. The selection transistor SEL selects the unit pixel 11 to be read out.

An anode of the photodiode PD is grounded, and a cathode thereof is connected to a source of the transfer transistor TRG. A drain of the transfer transistor TRG is connected to a gate of the amplification transistor AMP, and a connection point thereof configures the floating diffusion FD. The reset transistor RST is disposed between the floating diffusion FD and the vertical reset input line VRD.

A drain of the reset transistor RST is connected to the vertical reset input line VRD, and a source of the amplification transistor AMP is connected to the vertical current supply line VCOM. A drain of the amplification transistor AMP is connected to a source of the selection transistor SEL, and a drain of the selection transistor SEL is connected to the vertical signal line VSL.

Each of a gate of the transfer transistor TRG, a gate of the reset transistor RST, and a gate of the selection transistor SEL is connected to the vertical driving unit 13 via the pixel driving line LV, and pulses TRGsig, RSTsig, and SELsig as driving signals are respectively supplied thereto.

2.3 Circuit Configuration Example of Dummy Cell

Next, the following describes a circuit configuration example of dummy cells 11D that are disposed in the dummy differential pair formation region 10D of the pixel array unit 10 in FIG. 6 in a row and/or column shape.

Figure 8:
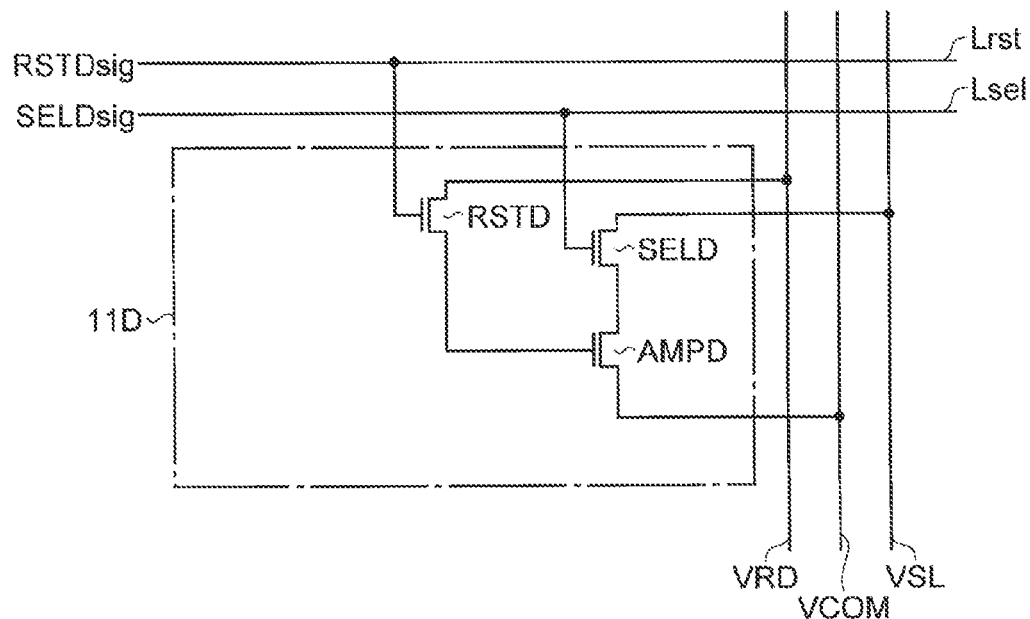
FIG. 8 is a circuit diagram illustrating a schematic configuration example of a dummy cell in a dummy differential pair formation region according to the first embodiment.

FIG. 8 is a circuit diagram illustrating a schematic configuration example of the dummy cell in the dummy differential pair formation region according to the present embodiment. As illustrated in FIG. 8, the dummy cell 11D is constituted of a reset transistor RSTD, an amplification transistor AMPD, a selection transistor SELD, the selection transistor driving line Lsel serving as the pixel driving line LD the one end of which is connected to the vertical driving unit 13, the reset transistor driving line Lrst, the vertical signal line VSL serving as the vertical pixel wiring LV the one end of which is connected to the column read-out circuit unit 14, the vertical reset input line VRD, and the vertical current supply line VCOM.

A drain of the reset transistor RSTD is connected to the vertical reset input line VRD, and a source of the amplification transistor AMPD is connected to the vertical current supply line VCOM. A source of the reset transistor RSTD is connected to a gate of the amplification transistor AMPD. A drain of the amplification transistor AMPD is connected to a source of the selection transistor SELD, and a drain of the selection transistor SELD is connected to the vertical signal line VSL.

Each of a gate of the reset transistor RSTD and a gate of the selection transistor SELD is connected to the vertical driving unit 13 via the pixel driving line LD, and pulses RSTDsig and SELDsig as driving signals are respectively supplied thereto.

The size of each transistor may be equal to the size of the unit pixel 11 in the effective pixel region 11V, for example. In the dummy differential pair formation region 10D, at least a pair of dummy cells 11D including the dummy cell 11D corresponding to the read-out pixel (signal pixel) and the dummy cell 11D corresponding to the reference pixel is disposed for each vertical signal line VSL.

2.4 Basic Function Example of Unit Pixel

Next, the following describes a basic function of the unit pixel 11. The reset transistor RST turns ON/OFF discharge of the electric charge accumulated in the floating diffusion FD in accordance with a reset signal RSTsig supplied from the vertical driving unit 13. When the reset signal RSTsig of High level is input to the gate of the reset transistor RST, the floating diffusion FD is clamped to a voltage that is applied through the vertical reset input line VRD. Due to this, the electric charge accumulated in the floating diffusion FD is discharged (reset). When the reset signal RSTsig of Low level is input to the gate of the reset transistor RST, the floating diffusion FD is electrically disconnected from the vertical reset input line VRD, and caused to be in a floating state.

The photodiode PD photoelectrically converts incident light, and generates an electric charge corresponding to an amount of the light. The generated electric charge is accumulated on a cathode side of the photodiode PD. The transfer transistor TRG turns ON/OFF transfer of the electric charge from the photodiode PD to the floating diffusion FD in accordance with a transfer control signal TRGsig supplied from the vertical driving unit 13. For example, when the transfer control signal TRGsig of High level is input to the gate of the transfer transistor TRG, the electric charge accumulated in the photodiode PD is transferred to the floating diffusion FD. On the other hand, when the transfer control signal TRGsig of Low level is supplied to the gate of the transfer transistor TRG, transfer of the electric charge from the photodiode PD is stopped. During a period in which the transfer transistor TRG stops transfer of the electric charge to the floating diffusion FD, the electric charge that is photoelectrically converted is accumulated in the photodiode PD.

The floating diffusion FD has a function of accumulating the electric charge that is transferred from the photodiode PD via the transfer transistor TRG, and converting the electric charge into a voltage. Thus, in the floating state in which the reset transistor RST is turned OFF, an electric potential of each floating diffusion FD is modulated in accordance with a charge amount accumulated therein.

The amplification transistor AMP functions as an amplifier using a potential variation of the floating diffusion FD connected to the gate thereof as an input signal, and an output voltage signal thereof is output to the vertical signal line VSL as a pixel signal via the selection transistor SEL.

The selection transistor SEL turns ON/OFF output of the voltage signal from the amplification transistor AMP to the vertical signal line VSL in accordance with a selection control signal SELsig supplied from the vertical driving unit 13. For example, when the selection control signal SELsig of High level is input to the gate of the selection transistor SEL, the voltage signal from the amplification transistor AMP is output to the vertical signal line VSL, and when the selection control signal SELsig of Low level is input thereto, output of the voltage signal to the vertical signal line VSL is stopped. Due to this, it is possible to extract only an output of the selected unit pixel 11 in the vertical signal line VSL to which a plurality of pixels are connected.

In this way, the unit pixel 11 is driven in accordance with the transfer control signal TRGsig, the reset signal RSTsig, and the selection control signal SELsig supplied from the vertical driving unit 13.

2.5 Example of Differential-Type Amplification Read-Out Configuration

Next, the following describes the differential-type amplification read-out configuration including the unit pixels 11 that are two-dimensionally arranged in the pixel array unit 10 in a matrix and the column read-out circuit unit 14.

Figure 9:
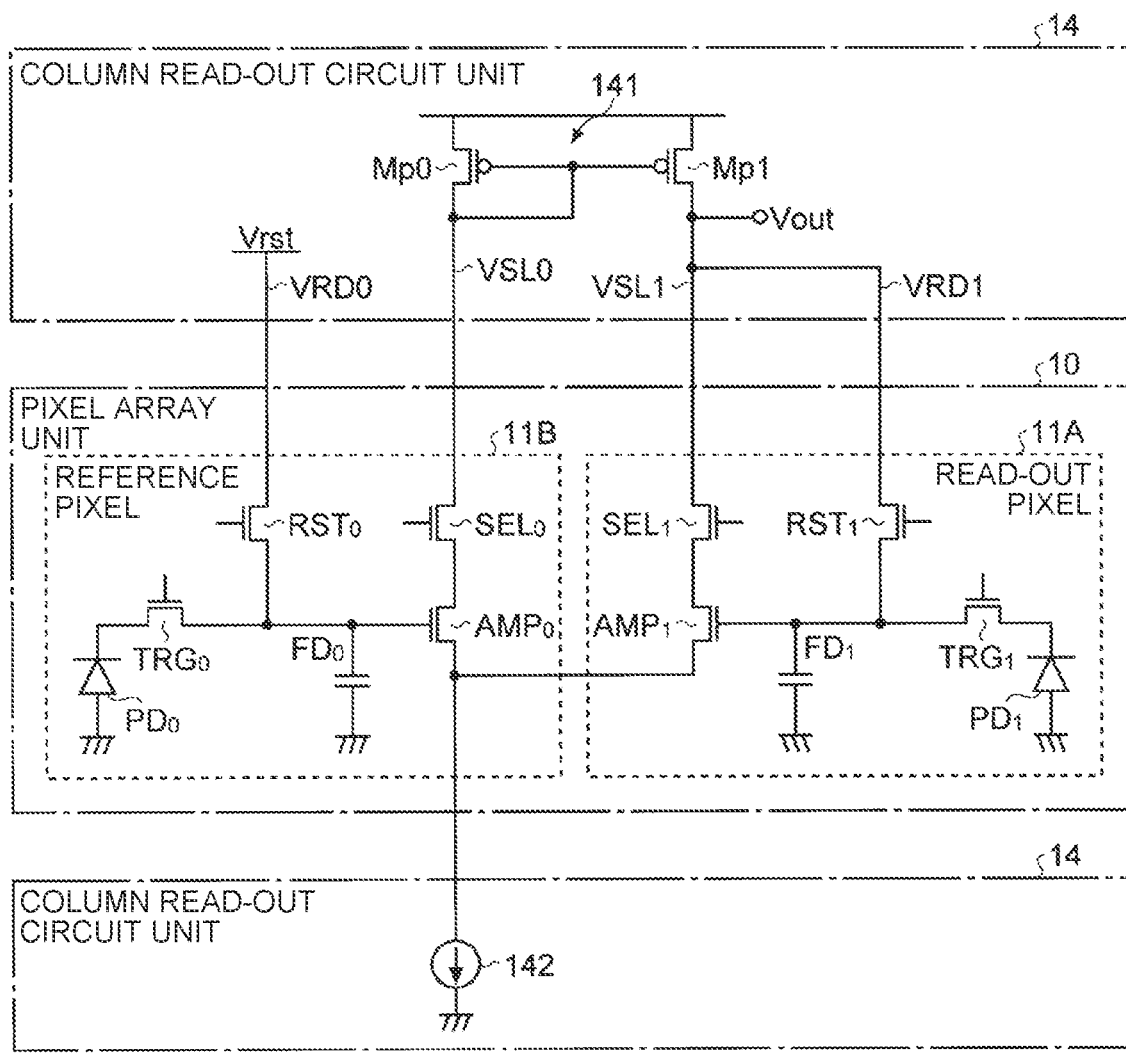
FIG. 9 is a circuit diagram illustrating a schematic configuration example of a differential-type amplification read-out configuration according to the first embodiment.

FIG. 9 is a circuit diagram illustrating a schematic configuration example of the differential-type amplification read-out configuration according to the present embodiment. The differential-type amplification read-out configuration illustrated in FIG. 9 is constituted of a unit pixel (hereinafter, referred to as a signal pixel) 11A from which the pixel signal is read out, a unit pixel (hereinafter, referred to as a reference pixel) 11B that gives a reference voltage for differential amplification, a current mirror circuit 141 including PMOS transistors Mp0 and Mp1 disposed in the column read-out circuit unit 14, and a tail current source unit 142 that supplies a constant current to the signal pixel 11A and the reference pixel 11B. In this case, the reference pixel 11B is preferably the unit pixel 11 in which potential variations in floating diffusion $FD_0$ at the time of reset moves equivalently to potential variations in floating diffusion $FD_1$ of the signal pixel 11A, and may be an inactive effective pixel that has been read out in the vicinity of the signal pixel (also referred to as a read-out pixel) 11A to be read out, for example.

A vertical reset input line VRD0 on the reference pixel 11B side is connected to a predetermined power supply Vrst in the column read-out circuit unit 14, and at the time of reset, a desired input voltage signal is applied to the floating diffusion $FD_0$ of the reference pixel 11B selected via the vertical reset input line VRD0, that is, an input terminal of an amplification transistor $AMP_0$ on the reference pixel 11B side.

The vertical signal line VSL0 on the reference pixel 11B side is connected to a drain and a gate of the PMOS transistor Mp0 on a reference side of the current mirror circuit 141 and a gate of the PMOS transistor Mp1 on a read-out side in the column read-out circuit unit 14.

On the other hand, a vertical signal line VSL1 on the read-out side is connected to a drain of the PMOS transistor Mp1 on the read-out side of the current mirror circuit 141 and the floating diffusion FD of the selected signal pixel 11A, that is, an input terminal of an amplification transistor $AMP_1$ on the read-out side via a reset transistor $RST_1$ in the column read-out circuit unit 14. Due to this, an output signal of the differential-type amplification read-out configuration is negatively fed back. The output signal of the differential-type amplification read-out configuration is extracted from the vertical signal line VSL1 as a pixel signal.

Vertical current supply lines CCOM on the reference side and the read-out side are connected to each other, and thereafter connected to the tail current source unit 142 as a constant current source configured by using a load MOS transistor such as an NMOS transistor, for example.

Figure 10:
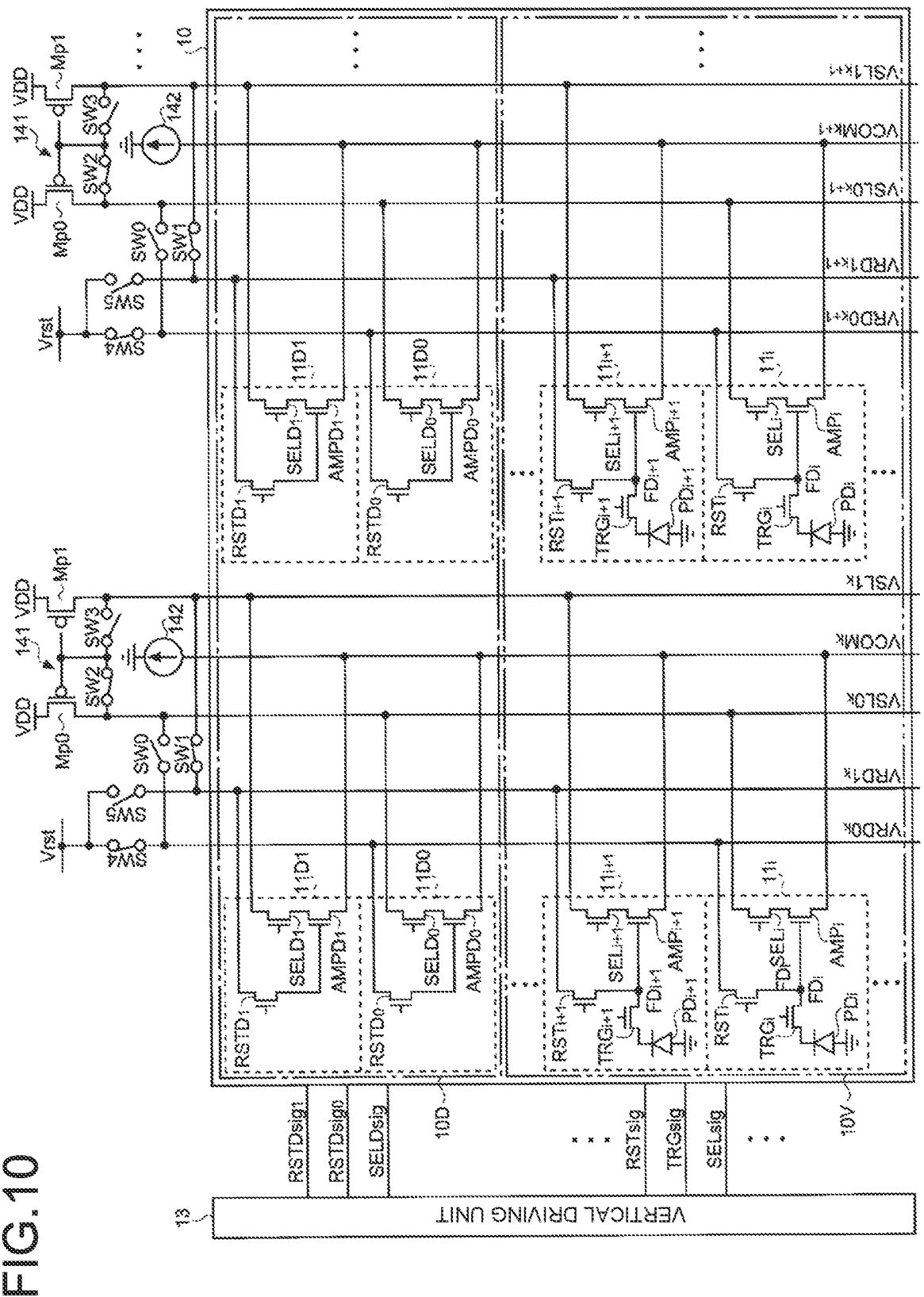
FIG. 10 is a circuit diagram illustrating a schematic configuration example of the differential-type amplification read-out configuration and a peripheral circuit thereof according to the first embodiment.

2.6 Example of Peripheral Circuit of Differential-Type Amplification Read-Out Configuration Subsequently, the following describes a configuration of the differential-type amplification read-out configuration including a peripheral circuit. FIG. 10 is a circuit diagram illustrating a schematic configuration example of the differential-type amplification read-out configuration and a peripheral circuit thereof according to the present embodiment. The differential-type amplification read-out configuration in FIG. 10 is similar to the differential-type amplification read-out configuration exemplified in FIG. 9. However, in FIG. 10, the reference pixel 11B in FIG. 9 is assumed to be a unit pixel $11_i$ in the effective pixel region 10V, and similarly, the signal pixel 11A is assumed to be a unit pixel $11_{i+1}$ in the effective pixel region 10V, by way of example.

As illustrated in FIG. 10, as the signal pixel 11A and the reference pixel 11B forming the differential-type amplification read-out configuration, for example, used are the two unit pixels $11_i$ and $11_{i+1}$ among the unit pixels 11 arranged in a column direction. That is, the differential amplifier circuit as the differential-type amplification read-out configuration is constituted of the tail current source unit 142 serving as the constant current circuit, the current mirror circuit 141, and the amplification transistors $AMP_i$ and $AMP_{i+1}$ of the respective two unit pixels 11.

A source of a reset transistor $RST_i$ of the unit pixel $11_i$ is connected to a vertical reset input line $VRD0_k$. On the other hand, a source of a reset transistor $RST_{i+1}$ of the unit pixel $11_{i+1}$ is connected to a vertical reset input line $VRD1_k$.

A source of a selection transistor $SEL_i$ of the unit pixel $11_i$ is connected to a vertical signal line $VSL0_k$. On the other hand, a source of a selection transistor $SEL_{i+1}$ of the unit pixel $11_{i+1}$ is connected to a vertical signal line $VSL1_k$.

Additionally, a source of the amplification transistor $AMP_i$ of the unit pixel $11_i$ and a source of the amplification transistor $AMP_{i+1}$ of the unit pixel $11_{i+1}$ are both connected to a vertical current supply line $VCOM_k$.

The vertical reset input line $VRD0_k$ is connected to the predetermined power supply Vrst via a switch SW4 to which a control signal CNTL0 of High level is input at the time of differential-type amplification read-out. Similarly, the vertical reset input line $VRD1_k$ is connected to the predetermined power supply Vrst via a switch SW5 to which a control signal CNTL1 of High level is input at the time of differential-type amplification read-out.

One end of the vertical signal line $VSL0_k$ is connected to the current mirror circuit 141. Similarly, one end of the vertical signal line $VSL1_k$ is connected to the current mirror circuit 141.

One end of the vertical current supply line $VCOM_k$ is connected to the tail current source unit 142 that is connected to the power supply voltage VDD.

The vertical reset input line $VRD0_k$ and the vertical signal line $VSL0_k$ are connected to each other via a switch SW0 to which a control signal CNTL0 for controlling switching of signal pixels in the column direction is input. Similarly, the vertical reset input line $VRD1_k$ and the vertical signal line $VSL1_k$ are connected to each other via a switch SW1 to which a control signal CNTL1 for controlling switching of signal pixels in the column direction is input.

Additionally, a drain of the PMOS transistor Mp0 disposed in the vertical signal line $VSL0_k$ in the current mirror circuit 141 is connected to gates of the PMOS transistors Mp0 and Mp1 via a switch SW2 to which the control signal CNTL0 for controlling switching of signal pixels in the column direction is input. Similarly, a drain of the PMOS transistor Mp1 disposed in the vertical signal line $VSL1_k$ in the current mirror circuit 141 is connected to the gates of the PMOS transistors Mp0 and Mp1 via a switch SW3 to which the control signal CNTL1 for controlling switching of signal pixels in the column direction is input.

In the configuration as described above, the signal pixel 11A and the reference pixel 11B constituting the differential pair in differential-type amplification read-out can be switched to each other by switching ON/OFF of each switch SW.

The combination of the signal pixel 11A and the reference pixel 11B is not limited to the two unit pixels $11_i$ and $11_{i+1}$ that are adjacent to each other in the column direction in the effective pixel region 10V. However, as illustrated in FIG. 10, for example, in a case in which the selection transistor $SEL_i$ of the unit pixel $11_i$ in an odd-numbered row is connected to the vertical signal line $VSL0_k$, the reset transistor $RST_i$ of the same unit pixel $11_i$ is connected to the vertical reset input line $VRD0_k$, the selection transistor $SEL_{i+1}$ of the unit pixel $11_{i+1}$ in an even-numbered row is connected to the vertical signal line $VSL1_k$, and the reset transistor $RST_{i+1}$ of the same unit pixel $11_{i+1}$ is connected to the vertical reset input line $VRD1_k$, the two adjacent unit pixels $11_i$ and $11_{i+1}$ can be combined with each other as the signal pixel 11A and the reference pixel 11B.

In a case of having such a connection relation, each unit pixel 11 in the effective pixel region 10V can operate as any of the signal pixel 11A and the reference pixel 11B by appropriately switching the switches SW0 to SW5. Thus, in the present embodiment, operation is performed such that the switches SW0 to SW5 are successively switched to scan an address while changing the combination of the signal pixel 11A and the reference pixel 11B, and the pixel signal is successively read out from all of the unit pixels 11 that are two-dimensionally arranged. For example, in a case in which the switches SW0, SW2, and SW4 are caused to be in an OFF state, and the switches SW1, SW3, and SW5 are caused to be in an ON state, the odd-numbered row (for example, the i-th row) can be caused to be a reference pixel row, and the even-numbered row (for example, the (i+1)-th row) can be caused to be a signal pixel row. Similarly, in a case in which the switches SW0, SW2, and SW4 are caused to be in the ON state, and the switches SW1, SW3, and SW5 are caused to be in the OFF state, the odd-numbered row (for example, the i-th row) can be caused to be the signal pixel row, and the even-numbered row (for example, the (i+1)-th row) can be caused to be the reference pixel row.

However, the embodiment is not limited thereto. The combination of the two unit pixels 11 can be variously modified so long as the selection transistors SEL of the respective unit pixels 11 are connected to different vertical signal lines VSL, and the reset transistors RST thereof are connected to different vertical reset input lines VRD.

The dummy differential pair formation region 10D according to the present embodiment may be, for example, arranged on one end side or both end sides of the vertical reset input line VRD and the vertical signal line VSL in a region adjacent to the effective pixel region 10V in the pixel array unit 10. In this case, a pair of the dummy cells 11D is arranged for each column of the unit pixel 11 in the effective pixel region 10V.

In FIG. 10, a dummy cell 11D0 is, for example, the dummy cell 11D corresponding to the unit pixel $11_i$, a drain of a selection transistor $SELD_0$ thereof is connected to the vertical signal line $VSL0_k$, and a drain of a reset transistor $RST_0$ is connected to the vertical reset input line $VRD0_k$. On the other hand, a dummy cell 11D1 is, for example, the dummy cell 11D corresponding to the unit pixel $11_{i+1}$, a drain of a selection transistor $SELD_1$ thereof is connected to the vertical signal line $VSL1_k$, and a drain of a reset transistor $RST_1$ is connected to the vertical reset input line $VRD1_k$.

The selection transistors $SELD_0$ and $SELD_1$ and the reset transistors $RSTD_0$ and $RSTD_1$ of the pair of dummy cells 11D0 and 11D1 configure the differential amplifier circuit (differential pair) when all of the unit pixels 11 in the effective pixel region 10V are caused to be in the ON state in a non-selected state. In this configured differential amplifier circuit, an inverting input (a gate of an amplification transistor $AMPD_1$) and an output (a drain of the amplification transistor $AMPD_1$) are short-circuited via the selection transistor $SELD_1$, the vertical signal line $VSL1_k$, the switch SW1, and the reset transistor RSTD1. Due to this, at the time of causing the signal pixel row to make transition to the next signal pixel row (for example, from the i-th row to the (i+1)-th row), it is possible to prevent a situation such that the selection transistors SEL of all of the unit pixels 11 are caused to be in the OFF state, and a current path for the differential pair configuring the differential-type amplification read-out configuration is eliminated. As a result, current consumption can be maintained, so that the settling period of the vertical signal line VSL can be prevented from being prolonged.

The selection transistors $SELD_0$ and $SELD_1$, and the reset transistors $RSTD_0$ and $RSTD_1$ of the pair of dummy cells 11D0 and 11D1 are also caused to be in the ON state in a period in which the electric charge is transferred from the photodiode PD to the floating diffusion FD, and similarly configure the differential amplifier circuit (differential pair) in which the inverting input (−input) and the output are short-circuited. Due to this, at the time of transferring the electric charge from the photodiode PD to the floating diffusion FD in each unit pixel 11, it is possible to prevent a situation such that the floating diffusion FD as the inverting input (also referred to as -input) of the differential pair is boosted and current balance of the differential pair collapses, and as a result, the settling period of the vertical signal line VSL can be prevented from being prolonged.

In the present embodiment, the reset transistors RSTD of the dummy cells 11D0 and 11D1 are not essential configurations, and may be omitted. In this case, the gate of the amplification transistor AMPD is connected to the vertical reset input line VRD. For example, in the configuration exemplified in FIG. 10, a gate of an amplification transistor $AMPD_0$ in the dummy cell 11D0 is connected to the vertical reset input line $VRD0_k$, and a gate of an amplification transistor $AMPD_1$ in the dummy cell 11D1 is connected to the vertical reset input line $VRD1_k$.

Figure 11:
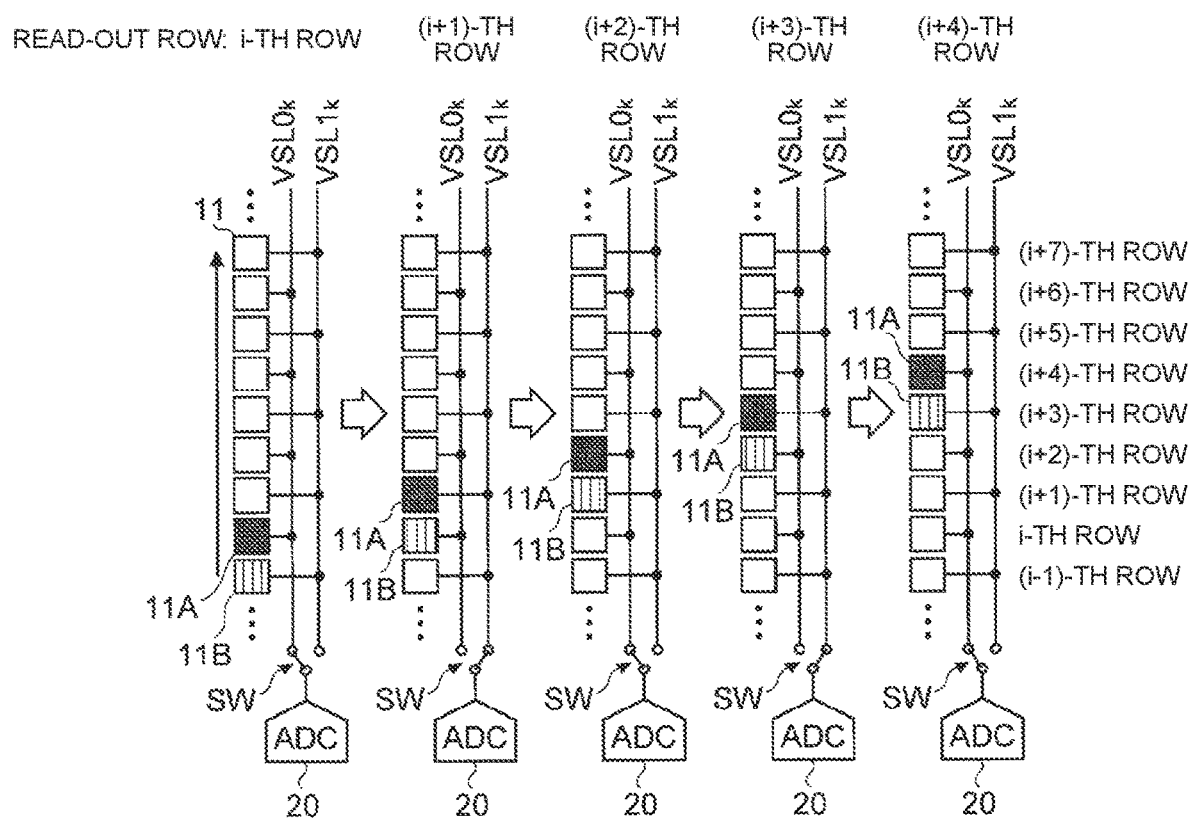
FIG. 11 is a schematic diagram for explaining a combination example of unit pixels forming the differential-type amplification read-out configuration according to the first embodiment.

2.7 Combination Example of Unit Pixels Forming Differential-Type Amplification Read-Out Configuration Next, the following describes a combination of the unit pixels 11 forming the differential-type amplification read-out configuration according to the present embodiment. FIG. 11 is a schematic diagram for explaining a combination example according to the present embodiment. In FIG. 11, as described above with reference to FIG. 10, for example, the selection transistor $SEL_i$ of the unit pixel $11_i$ in the odd-numbered row is assumed to be connected to the vertical signal line $VSL0_k$, and the selection transistor $SEL_{i+1}$ of the unit pixel $11_{i+1}$ in the even-numbered row is assumed to be connected to the vertical signal line $VSL1_k$.

In a case in which the unit pixels 11 arranged in the column direction are alternately connected to different vertical signal lines VSL, as illustrated in FIG. 11, the two unit pixels 11 adjacent to each other among the unit pixels 11 arranged in the column direction are selected as the signal pixel 11A and the reference pixel 11B. For example, at the time of reading out the i-th row, the unit pixel $11_i$ is selected as the signal pixel 11A, and the unit pixel $11_{i-1}$ is selected as the reference pixel 11B.

Subsequently, at the time of reading out the (i+1)-th row, the unit pixel $11_{i+1}$ is selected as the signal pixel 11A, and the unit pixel $11_i$ is selected as the reference pixel 11B. Thereafter, the row of the unit pixel 11 selected as the reference pixel 11B (hereinafter, referred to as a reference row) is switched along with switching of the row of the unit pixel 11 selected as the signal pixel 11A (hereinafter, referred to as a read-out row). In the example illustrated in FIG. 11, for example, the read-out unit pixel 11 adjacent to the signal pixel 11A is selected as the reference pixel 11B, and the reference row makes transition following transition of the read-out row.

However, the reference row is not limited to a row that is caused to be the read-out row immediately before the read-out row, but may be a row to be selected as the read-out row next.

2.8 Driving Example of Differential-Type Amplification Read-Out Configuration

Figure 12:
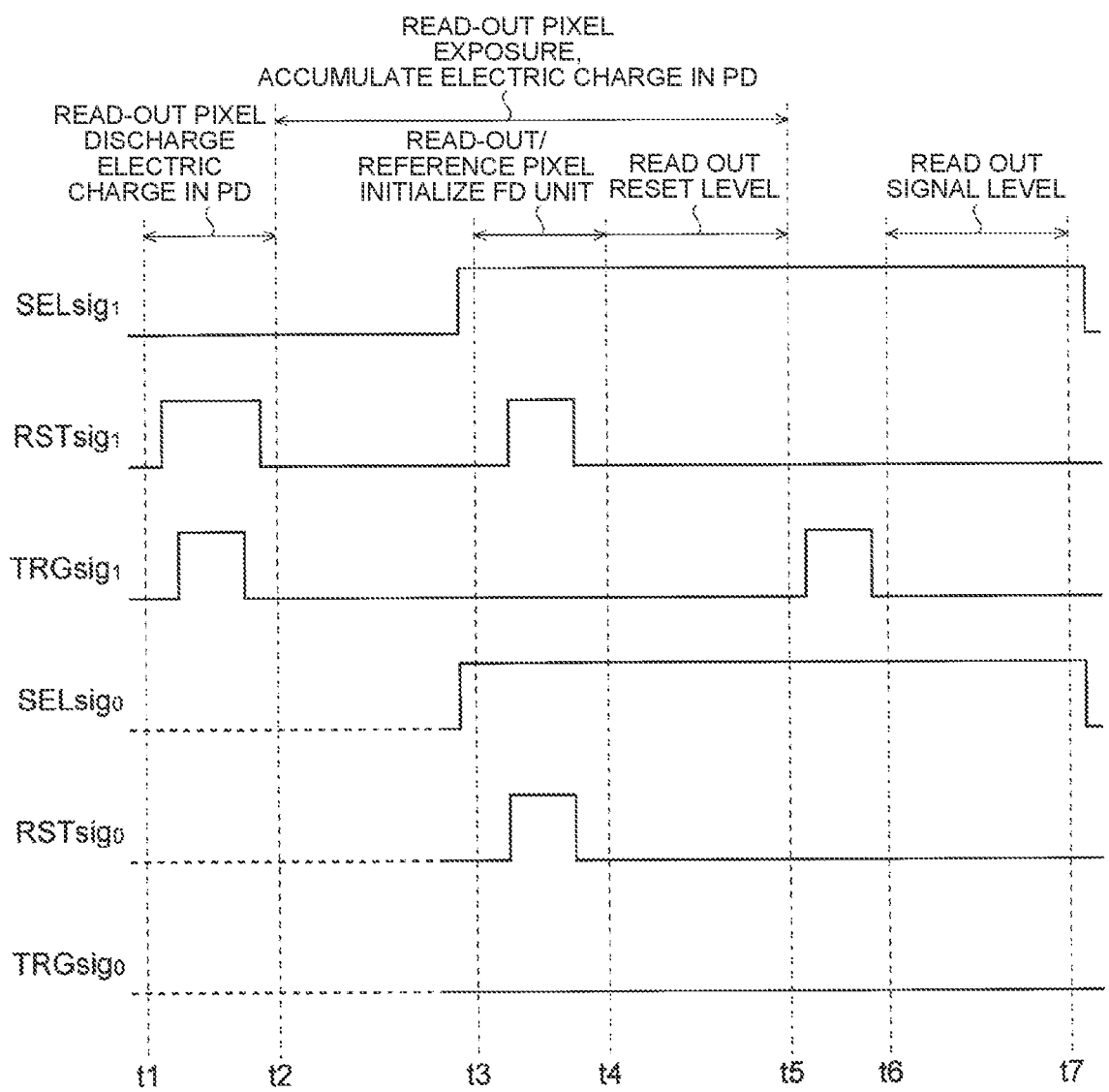
FIG. 12 is a timing chart illustrating a driving example of the differential-type amplification read-out configuration according to the first embodiment.

Next, the following describes a driving example of the differential-type amplification read-out configuration. For clarification, the following description is based on the differential-type amplification read-out configuration illustrated in FIG. 9. FIG. 12 is a timing chart illustrating a driving example of the differential-type amplification read-out configuration according to the present embodiment.

As illustrated in FIG. 12, in the differential-type amplification read-out according to the present embodiment, first, when a reset signal $RSTsig_1$ and a transfer control signal $TRGsig_1$ input to the signal pixel 11A rise to High level in a period from a time t1 to a time t2, the electric charges accumulated in the photodiode $PD_1$ and the floating diffusion $FD_1$ of the signal pixel 11A are discharged via the reset transistor $RST_1$. Due to this, the electric charges that have been accumulated in the photodiode $PD_1$ are swept, and electric charges that are newly obtained by photoelectrically converting incident light are accumulated in the photodiode PD1 in a period from the time t2 to a time t5.

Next, when a selection control signals $SELsig_1$ and $SELsig_0$ of the selected signal pixel 11A and reference pixel 11B rise from Low level to High level in a period from a time t3 to a time t7, a current is supplied from the tail current source unit 142 in a direction from respective sources of the amplification transistor $AMP_1$ of the signal pixel 11A and the amplification transistor $AMP_0$ of the reference pixel 11B to respective drains thereof. Due to this, the differential amplifier circuit (differential-type amplification read-out configuration) using the electric potential of the floating diffusion $FD_1$ of the signal pixel 11A as an input voltage signal operates, and as a result, an amplified voltage signal is output to the vertical signal line VSL. This state continues until the selection control signals $SELsig_1$ and $SELsig_0$ become at Low level at the time t7.

In the period from the time t1 to the time t3, each of driving signals $SELsig_0$, $RSTsig_0$, and $TRGsig_0$ of the reference pixel 11B does not contribute to signal read-out of the signal pixel 11A.

When the reset signal $RSTsig_1$ input to the signal pixel 11A and the reset signal $RSTsig_0$ input to the reference pixel 11B rise to High level in a period from the time t3 to a time t4, the electric charges accumulated in the floating diffusion $FD_1$ and the floating diffusion $FD_0$ of the signal pixel 11A and the reference pixel 11B are discharged, and an output signal level is initialized (reset) accordingly.

At this point, an output Vout of the differential amplifier circuit is electrically connected to the floating diffusion $FD_1$ of the signal pixel 11A as one of inputs of the differential amplifier circuit via the vertical reset input line VRD1 and the reset transistor $RST_1$ on the signal pixel 11A side. As a result, the output Vout of the differential amplifier circuit is negatively fed back to the floating diffusion $FD_1$ of the signal pixel 11A to be in a virtual grounded state, so that the floating diffusion $FD_0$ of the reference pixel 11B that is externally applied to be fixed to a predetermined power supply Vrst, the floating diffusion $FD_1$ of the signal pixel 11A, and the output Vout have the same potential (a configuration of a voltage follower circuit).

Next, when the reset signal $RSTsig_1$ input to the signal pixel 11A and the reset signal $RSTsig_0$ input to the reference pixel 11B fall from High level to Low level, the floating diffusion $FD_1$ and the floating diffusion $FD_0$ of the signal pixel 11A and the reference pixel 11B are electrically disconnected from the respective vertical reset input lines VRD1 and VRD0 to be in a floating state.

At this point, the structures of the floating diffusion $FD_1$ of the signal pixel 11A and the floating diffusion $FD_0$ of the reference pixel 11B are substantially equivalent to each other, so that potential variations at the time of reset-off (reset feedthrough) become substantially the same, and the electric potential of the floating diffusion $FD_1$ of the signal pixel 11A and the electric potential of the floating diffusion $FD_0$ of the reference pixel 11B move in substantially the same way. Thus, the output of the differential amplifier circuit is hardly changed from a voltage level of the power supply Vrst at the time of reset ON. This state is a reset (initial) state in the differential-type amplification read-out, and this output level is a reset (initial) level in the differential-type amplification read-out. This is because in-phase signal components of both inputs of the differential amplifier circuit are not amplified. This reset state continues until a signal charge is transferred at the time t5 while a voltage as the reset level is read out.

Next, when the transfer control signal $TRGsig_1$ of the signal pixel 11A rises to High level in a pulse form in a period from the time t5 to the time t6, the electric charge accumulated in the photodiode PD1 of the signal pixel 11A is transferred to the floating diffusion $FD_1$ via the transfer transistor $TRG_1$. The electric potential of the floating diffusion $FD_1$ of the signal pixel 11A is modulated by the transferred electric charge. When the modulated electric potential is input to a gate of the amplification transistor $AMP_1$ of the signal pixel 11A as a voltage signal, a voltage signal corresponding to an accumulated charge amount is output to the vertical signal line VSL1 on the signal pixel 11A side.

This signal read-out state continues until the selection control signal $SELsig_1$ becomes at Low level at the time t7 while a voltage as a signal level is read out.

By taking a difference between the reset level and the signal level that are read out as previously described, CDS processing for removing noises is performed, and the pixel signal from which the noises are removed is read out accordingly.

2.9 Driving Example at Time of Differential-Type Amplification Read-Out (Switching Between Read-Out Pixel and Reference Pixel)

Subsequently, the following describes a driving example at the time of differential-type amplification read-out including the switches SW0 to SW5 in the peripheral circuit. The following description is based on the differential-type amplification read-out configuration illustrated in FIG. 10. The configuration of the (i–1)-th row is not illustrated in FIG. 10, but is easily conceivable from the configurations of the i-th row and the (i+1)-th row, so that the description will be made assuming that the configuration of the (i-1)-th row is illustrated herein.

Figure 13:
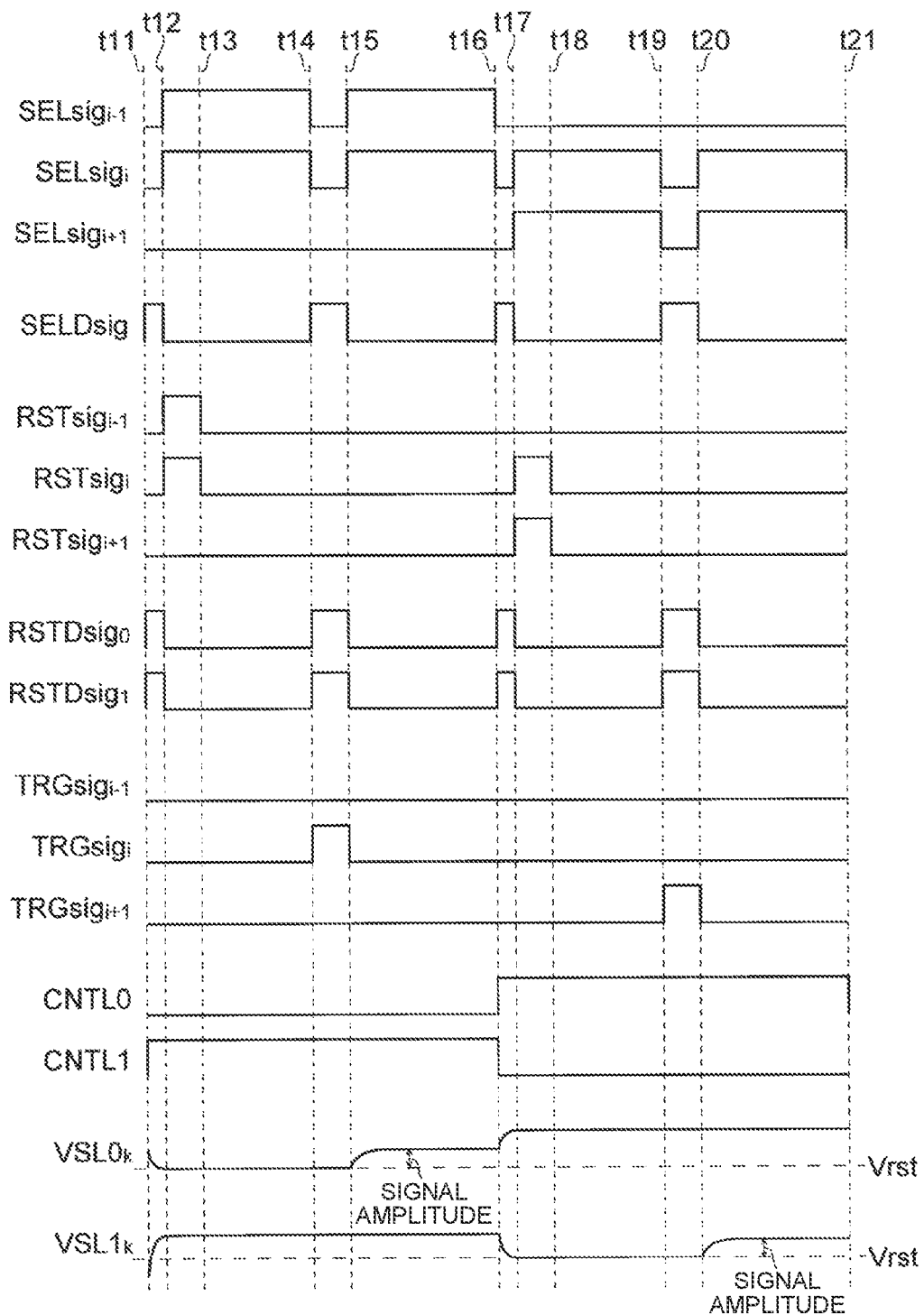
FIG. 13 is a timing chart illustrating a driving example at the time of differential-type amplification read-out including switches in the peripheral circuit according to the first embodiment.

FIG. 13 is a timing chart illustrating a driving example at the time of differential-type amplification read-out including the switches in the peripheral circuit according to the present embodiment. In the driving example illustrated in FIG. 13, from the timing t11 to the timing t16, the switches SW0, SW2, and SW4 are caused to be in an OFF state, the switches SW1, SW3, and SW5 are caused to be in an ON state, the unit pixel $11_{i-1}$ in the (i–1)-th row is caused to be the reference pixel 11B, and the unit pixel $11_i$ in the i-th row is caused to be the signal pixel 11A. Additionally, from the timing t16 to the timing t21, the switches SW0, SW2, and SW4 are caused to be in the ON state, the switches SW1, SW3, and SW5 are caused to be in the OFF state, the unit pixel $11_i$ in the i-th row is caused to be the reference pixel 11B, and the unit pixel $11_{i+1}$ in the (i+1)-th row is caused to be the signal pixel 11A.

As illustrated in FIG. 13, in a period (from the timing t11 to the timing t16) in which the signal level is read out by causing the unit pixel $11_i$ in the i-th row to be the signal pixel 11A, the control signal CNTL0 is caused to be at Low level, the switches SW0, SW2, and SW4 are caused to be in the OFF state, the control signal CNTL1 is caused to be at High level, and the switches SW1, SW3, and SW5 are caused to be in the ON state.

In this period (from the timing t11 to the timing t16), a period from the timing t11 to the timing t12 is a period in which the vertical driving unit 13 causes a pixel address of the unit pixel 11 to be read out to make transition to a pixel address of the next unit pixel 11. Thus, in the period from the timing t11 to the timing t12, all of the unit pixels 11 in the effective pixel region 10V are caused to be in a non-selected state. Thus, in the present embodiment, selection control signals SELDsig applied to the gates of the respective selection transistors $SELD_0$ and $SELD_1$ of the pair of dummy cells 11D0 and 11D1 are raised to High level in a pulse form, and reset signals $RSTDsig_0$ and $RSTDsig_1$ applied to gates of the respective reset transistors $RSTD_0$ and $RSTD_1$ of the dummy cells 11D0 and 11D1 are raised to High level in a pulse form. Due to this, the differential amplifier circuit in which the inverting input (-input) and the output are short-circuited is formed by the pair of dummy cells 11D0 and 11D1, the current mirror circuit 141, and the tail current source unit 142, and a current path for the differential pair is formed, so that current consumption can be maintained.

Next, in a period from the timing t12 to the timing t13, by raising a reset signal $RSTsig_{i-1}$ applied to a gate of a reset transistor $RST_{i-1}$ of the unit pixel $11_{i-1}$ selected as the reference pixel 11B and a reset signal $RSTsig_i$ applied to a gate of the reset transistor $RST_i$ of the unit pixel $11_i$ selected as the signal pixel 11A to High level in a pulse form, floating diffusion $FD_{i-1}$ and floating diffusion $FD_i$ of the respective unit pixels $11_{i-1}$ and $11_i$ forming the differential pair having a negative feedback configuration are reset.

Thereafter, when the reset signals $RSTsig_{i-1}$ and $RSTsig_i$ fall to Low level at the timing t13, the column read-out circuit unit 14 reads out a voltage level appearing in the vertical signal line $VSL0_k$ as a reset level (P phase) in a period from the timing t13 to the timing t14, and the column signal processing unit 15 AD-converts the read-out reset level.

Next, by raising a transfer control signal $TRGsig_i$ applied to a gate of a transfer transistor $TRG_i$ of the unit pixel $11_i$ as the signal pixel 11A to High level in a pulse form in a period from the timing t14 to the timing t15, the electric charge generated in a photodiode $PD_i$ of the unit pixel $11_i$ is transferred to the floating diffusion $FD_i$.

Similarly, in a period from the timing t14 to the timing t15, selection control signals $SELsig_{i-1}$ and $SELsig_i$ applied to gates of selection transistors $SEL_{i-1}$ and $SEL_i$ of the respective unit pixels $11_{i-1}$ and $11_i$ are caused to fall to Low level in a pulse form, and a selection control signal SELDsig applied to the gates of the selection transistors $SELD_0$ and $SELD_1$ of the dummy cells 11D0 and 11D1 and the reset signals $RSTDsig_0$ and $RSTDsig_1$ applied to the gates of the reset transistors $RSTD_0$ and $RSTD_1$ are raised to High level in a pulse form. Due to this, the differential amplifier circuit in which the inverting input (-input) and the output are short-circuited is formed, so that it is possible to prevent a situation such that the floating diffusion $FD_i$ of the unit pixel $11_i$ as the inverting input of the differential pair is boosted and current balance of the differential pair collapses.

Thereafter, when the selection control signals SELDsig of the dummy cells 11D0 and 11D1 and the reset signals $RSTDsig_0$ and $RSTDsig_1$ are caused to fall, and the selection control signals $SELsig_{i-1}$ and $SELsig_i$ of the unit pixels $11_{i-1}$ and $11_i$ rise at the timing t15, the column read-out circuit unit 14 reads out a voltage level appearing in the vertical signal line $VSL0_k$ as a signal level (D phase: pixel signal) during a period from the timing t15 to the timing t16, and the column signal processing unit 15 AD-converts the read-out signal level.

A digital value of the reset level (P phase) is subtracted from a digital value of the signal level (D phase) in the column signal processing unit 15 or a peripheral circuit such as the signal processing unit 17 to perform CDS processing of acquiring a digital value of a signal component corresponding to an amount of received light of the photodiode $PD_i$.

Subsequently, in a period (from the timing t16 to the timing t21) in which the signal level is read out by causing the unit pixel $11_{i+1}$ in the (i+1)-th row to be the signal pixel 11A, the control signal CNTL0 is caused to be at High level, the switches SW0, SW2, and SW4 are caused to be in the ON state, the control signal CNTL1 is caused to be at Low level, and the switches SW1, SW3, and SW5 are caused to be in the OFF state.

In this period (from the timing t16 to the timing t21), similarly to the period (from the timing t11 to the timing t16) in which the signal level is read out by causing the unit pixel $11_i$ in the i-th row to be the signal pixel 11A, the differential amplifier circuit including the pair of dummy cells 11D0 and 11D1, the current mirror circuit 141, and the tail current source unit 142 is formed by causing the selection transistors $SELD_0$ and $SELD_1$ and the reset transistors $RSTD_0$ and $RSTD_1$ of the dummy cells 11D0 and 11D1 to be in the ON state in the period from the timing t16 to the timing t17 in which all of the unit pixels 11 in the effective pixel region 10V are caused to be in the non-selected state.

In a period from the timing t17 to the timing t18, the reset transistors $RST_i$ and $RST_{i+1}$ of the unit pixel $11_i$ as the reference pixel 11B and the unit pixel $11_{i+1}$ as the signal pixel 11A are caused to be in the ON state to reset the floating diffusion $FD_i$ and the floating diffusion $FD_{i+1}$, and in a period from the timing t18 to the timing t19, a reset level appearing in the vertical signal line $VSL1_k$ is read out and AD-converted.

Thereafter, in a period from the timing t19 to the timing t20, the differential amplifier circuit in which the inverting input (-input) and the output are short-circuited is formed by causing a transfer transistor $TRG_{i+1}$ to be in the ON state, transferring the electric charge of a photodiode $PD_{i+1}$ to the floating diffusion $FD_{i+1}$, and causing the selection transistors $SELD_0$ and $SELD_1$ and the reset transistors $RSTD_0$ and $RSTD_1$ of the dummy cells 11D0 and 11D1 to be in the ON state, so that it is possible to prevent a situation such that the floating diffusion $FD_{i+1}$ of the unit pixel $11_{i+1}$ as the inverting input of the differential pair is boosted and current balance of the differential pair collapses.

In a period from the timing t20 to the timing t21, the signal level appearing in the vertical signal line $VSL1_k$ is read out and AD-converted.

Thereafter, a digital value of the reset level (P phase) is subtracted from a digital value of the signal level (D phase) in the column signal processing unit 15 or a peripheral circuit such as the signal processing unit 17 to perform CDS processing of acquiring a digital value of a signal component corresponding to an amount of received light of the photodiode PD.

2.10 Function and Effect

As described above, according to the present embodiment, during a period (a period from the timing t11 to the timing t12, and from the timing t16 to the timing t17 in FIG. 13) in which all of the unit pixels 11 in the effective pixel region 10V are caused to be in the non-selected state, the differential amplifier circuit in which the inverting input (-input) and the output are short-circuited is formed by the amplification transistors $AMPD_0$ and $AMPD_1$ of the dummy cells 11D0 and 11D1, the current mirror circuit 141, and the tail current source unit 142, and current consumption is maintained, so that the power supply voltage VDD and a drop amount of ground voltage can be maintained. Due to this, the settling time of the vertical signal lines $VSL0_k$ and $VSL1_k$ can be prevented from being prolonged.

In a transfer period (a period from the timing t14 to the timing t15, and from the timing t19 to the timing t20 in FIG. 13) in which the electric charge is transferred from the photodiode PD to the floating diffusion FD, the vertical signal line VSL is separated from the unit pixel 11, and the voltage level of the vertical signal line VSL is maintained at the reset level, so that it is possible to prevent a situation such that a large amplitude is generated in the vertical signal line VSL by feedthrough caused by capacitive coupling of the transfer transistor TRG and the floating diffusion FD, and the settling time of the vertical signal line VSL can be prevented from being prolonged accordingly.

3. Second Embodiment

Next, the following describes the solid-state imaging device and the electronic apparatus according to a second embodiment in detail with reference to the drawings. In the following description, redundant description about the same configurations and operations as those in the embodiment described above will not be repeated by reference.

In the first embodiment described above, as a combination example of the unit pixels forming the differential-type amplification read-out configuration, exemplified is a case of selecting a pair of unit pixels 11 forming the differential pair so that the differential pair is formed of the two unit pixels 11 in the effective pixel region 10V, and the reference pixel 11B follows switching of the signal pixel 11A (refer to FIG. 11). On the other hand, the second embodiment describes a case of fixing the reference pixel 11B to the unit pixel 11 in a specific row (hereinafter, referred to as a reference-only row) by way of example.

Figure 14:
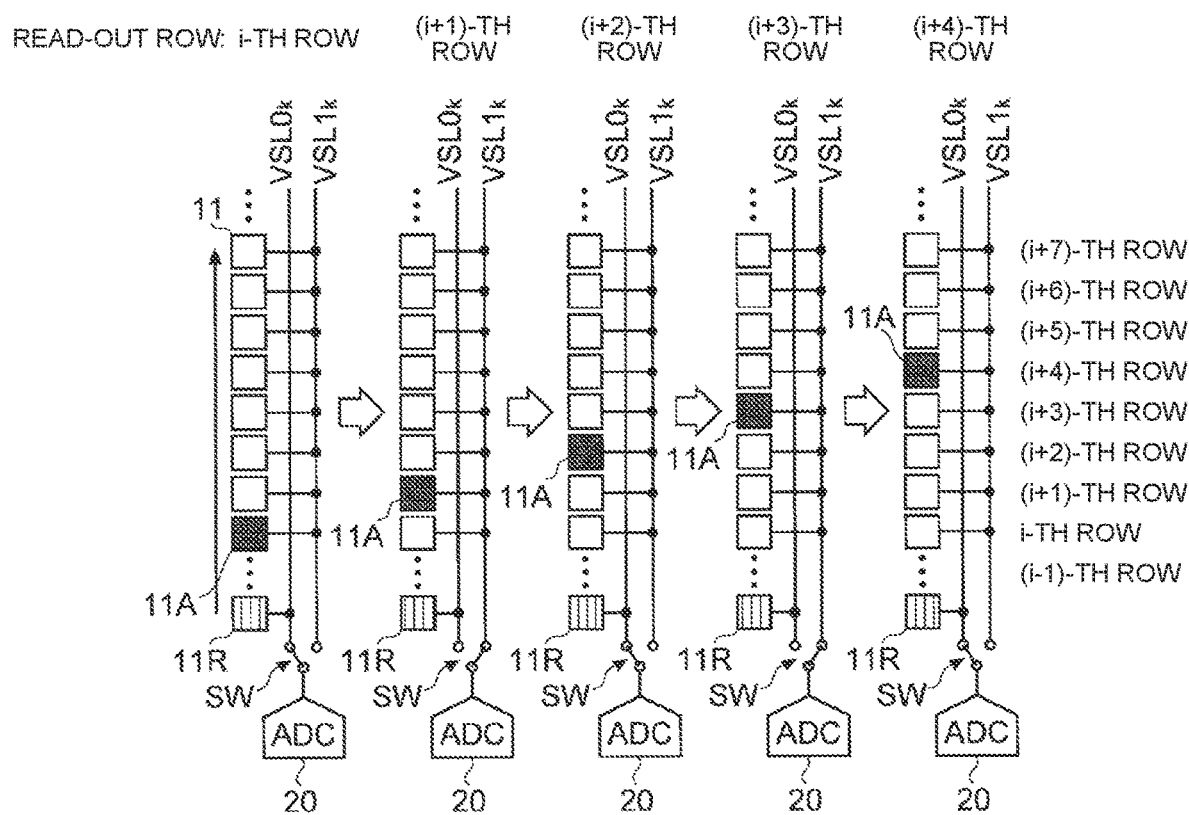
FIG. 14 is a schematic diagram for explaining a combination example of unit pixels forming a differential-type amplification read-out configuration according to a second embodiment.

3.1 Combination Example of Unit Pixels Forming Differential-Type Amplification Read-Out Configuration FIG. 14 is a schematic diagram for explaining a combination example according to the present embodiment. As illustrated in FIG. 14, in this combination example, the reference row is fixed to a specific row (reference-only row). The reference-only row may be, for example, an end row of the unit pixels 11 arranged in a matrix. Alternatively, the reference-only row may be a row other than rows in the effective pixel region 10V of the pixel array unit 10.

A reference pixel 11R in the reference-only row is connected to the vertical signal line $VSL0_k$, and all of the unit pixels 11 in the effective pixel region 10V that may be selected as the signal pixel 11A are connected to the vertical signal line $VSL1_k$.

Similarly to the reference pixel 11B, the reference pixel 11R may have the same configuration as that of the normal unit pixel 11. The reference pixel 11R is caused to be in a selected state at all times, that is, the selection transistor TRG is caused to be in an ON state at all times, during a read-out period.

Figure 15:
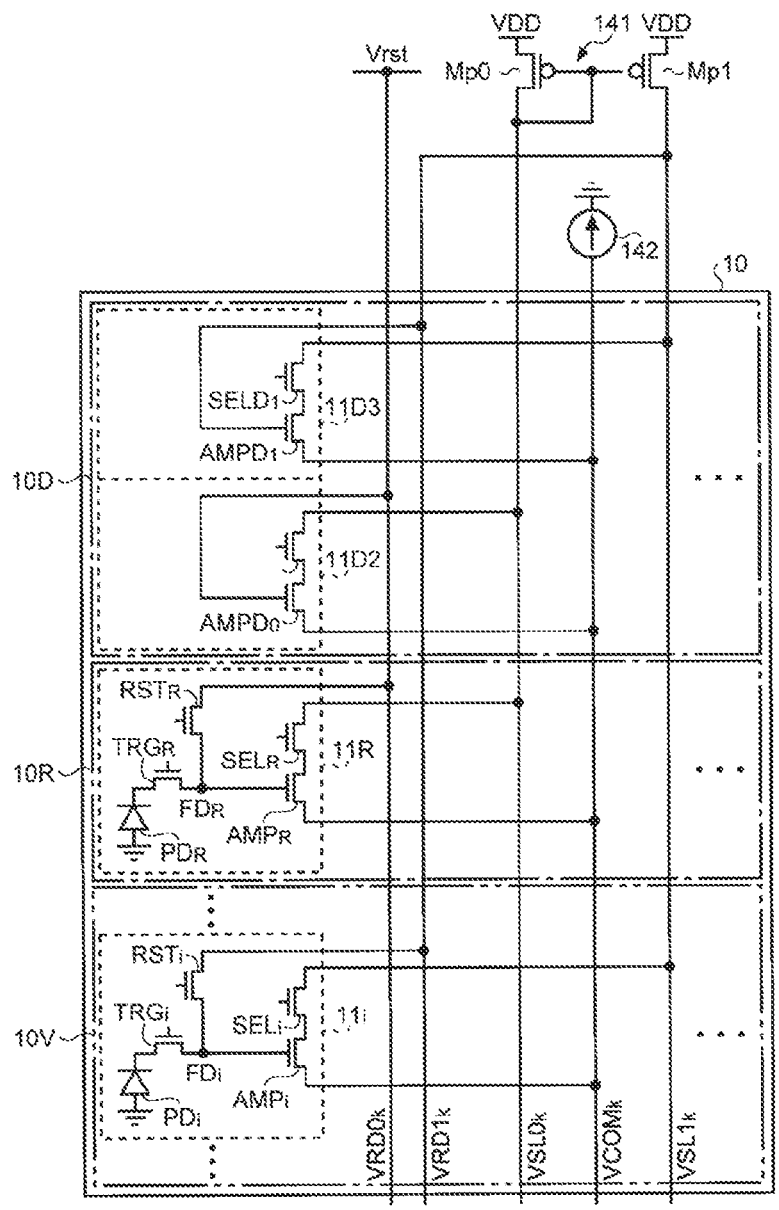
FIG. 15 is a circuit diagram illustrating a schematic configuration example of the differential-type amplification read-out configuration and a peripheral circuit thereof according to the second embodiment.

3.2 Example of Peripheral Circuit of Differential-Type Amplification Read-Out Configuration Subsequently, the following describes the configuration of the differential-type amplification read-out configuration including the peripheral circuit. FIG. 15 is a circuit diagram illustrating a schematic configuration example of the differential-type amplification read-out configuration and the peripheral circuit thereof according to the present embodiment. The differential-type amplification read-out configuration in FIG. 15 has the same configuration as the differential-type amplification read-out configuration exemplified in FIG. 14. However, in FIG. 15, by way of example, the reference pixel 11R in FIG. 14 is caused to be the unit pixel 11 in a reference pixel region 10R outside the effective pixel region 10V, and the signal pixel 11A is caused to be the unit pixel $11_i$ in the effective pixel region 10V.

In the configuration illustrated in FIG. 15, the unit pixel $11_i$ in the effective pixel region 11V may have the same configuration as that described in the first embodiment with reference to FIG. 10, for example. However, in the present embodiment, all drains of the selection transistors $SEL_i$ of the unit pixels $11_i$ in the effective pixel region 11V are connected to the vertical signal line $VSL1_k$, and all drains of the reset transistors $RST_i$ are connected to the vertical reset input line $VRD1_k$.

The reference pixel 11R in the reference pixel region 10R has the same configuration as that of the unit pixel $11_i$ in the effective pixel region 11V, for example. However, a drain of a selection transistor $SEL_R$ of the reference pixel 11R is connected to the vertical signal line $VSL0_k$, and a drain of a reset transistor $RST_R$ is connected to the vertical reset input line $VRD0_k$.

A pair of dummy cells 11D2 and 11D3 in the dummy differential pair formation region 10D has the same configuration as that of the pair of dummy cells 11D0 and 11D1 illustrated in FIG. 10 except that the reset transistors $RSTD_0$ and $RSTD_1$ are omitted. A gate of the amplification transistor $AMPD_0$ of the dummy cell 11D2 is connected to the vertical reset input line $VRD0_k$, and a gate of the amplification transistor $AMPD_1$ of the dummy cell 11D3 is connected to the vertical reset input line $VRD1_k$.

In this way, in a configuration in which the reference pixel 11R is fixed to the unit pixel 11 of the specific reference-only row, the reset transistors $RSTD_0$ and $RSTD_1$ of the pair of dummy cells 11D2 and 11D3 can be omitted. The signal pixel 11A and the reference pixel 11R are not required to be switched to each other, so that the switches SW0 to SW5 exemplified in FIG. 10 can be omitted, for example.

3.3 Driving Example at Time of Differential-Type Amplification Read-Out (Switching Between Read-Out Pixel and Reference Pixel)

Subsequently, the following describes a driving example at the time of differential-type amplification read-out. The following description is based on the differential-type amplification read-out configuration illustrated in FIG. 15.

Figure 16:
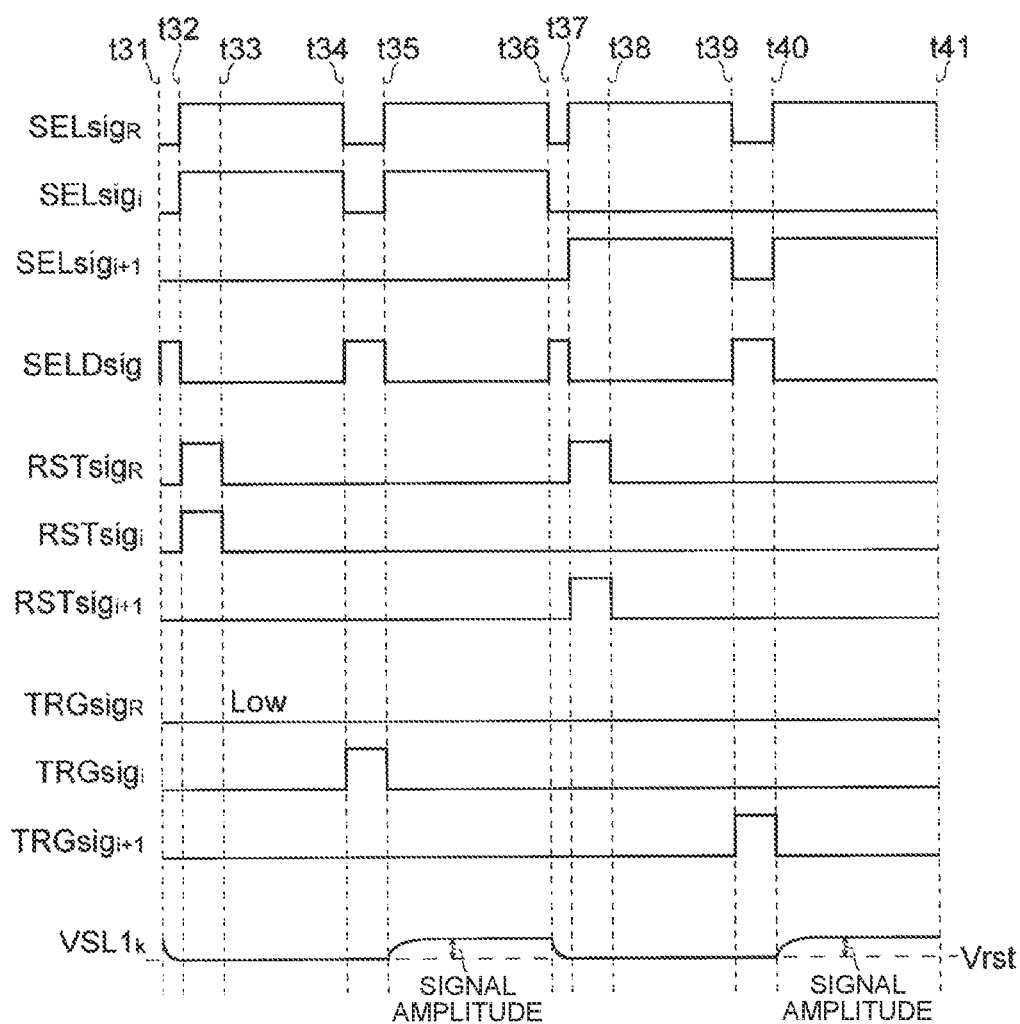
FIG. 16 is a timing chart illustrating a driving example at the time of differential-type amplification read-out according to the second embodiment.

FIG. 16 is a timing chart illustrating a driving example at the time of differential-type amplification read-out according to the present embodiment. In the driving example illustrated in FIG. 16, the unit pixel $11_i$ in the i-th row is caused to be the signal pixel 11A from the timing t31 to the timing t36, and the unit pixel $11_{i+1}$ in the (i+1)-th row is caused to be the signal pixel 11A from the timing t36 to the timing t41.

As illustrated in FIG. 16, in a period (from the timing t31 to the timing t36) in which the signal level is read out by causing the unit pixel $11_i$ in the i-th row to be the signal pixel 11A, a period from the timing t31 to the timing t32 is a period in which the vertical driving unit 13 causes the pixel address of the unit pixel 11 to be read out to make transition to the pixel address of the next unit pixel 11. Thus, in the period from the timing t31 to the timing t32, all of the unit pixels 11 in the effective pixel region 10V are caused to be in the non-selected state. Accordingly, in the present embodiment, the selection control signals SELDsig applied to the gates of the selection transistors $SELD_0$ and $SELD_1$ of the pair of dummy cells 11D2 and 11D3 are raised to High level in a pulse form. Due to this, the differential amplifier circuit in which the inverting input (-input) and the output are short-circuited is formed by the pair of dummy cells 11D0 and 11D1, the current mirror circuit 141, and the tail current source unit 142, and a current path for the differential pair is formed, so that it is possible to prevent a current that lost a flow-out destination from being accumulated in the vertical signal line VSL.

Next, in a period from the timing t32 to the timing t33, by raising a reset signal $RSTsig_R$ applied to a gate of the reset transistor $RST_R$ of the reference pixel 11R and the reset signal $RSTsig_i$ applied to the gate of the reset transistor $RST_i$ of the unit pixel $11_i$ selected as the signal pixel 11A to High level in a pulse form, floating diffusion $FD_R$ and floating diffusion $FD_i$ of the respective reference pixel 11R and the unit pixel $11_i$ forming the differential pair having a negative feedback configuration are reset.

Thereafter, when the reset signals $RSTsig_R$ and $RSTsig_i$ fall to Low level at the timing t33, the column read-out circuit unit 14 reads out a voltage level appearing in the vertical signal line $VSL0_k$ as the reset level (P phase) during a period from the timing t33 to the timing t34, and the read-out reset level is AD-converted by the column signal processing unit 15.

Next, by raising the transfer control signal $TRGsig_i$ applied to a gate of the transfer transistor $TRG_i$ of the unit pixel $11_i$ as the signal pixel 11A to High level in a pulse form in a period from the timing t34 to the timing t35, the electric charge generated in the photodiode $PD_i$ of the unit pixel $11_i$ is transferred to the floating diffusion $FD_i$.

Similarly, in a period from the timing t34 to the timing t35, the selection control signals $SELsig_R$ and $SELsig_i$ applied to the gates of the selection transistors $SEL_R$ and $SEL_i$ of the respective reference pixel 11R and the unit pixel $11_i$ are caused to fall to Low level in a pulse form, and the selection control signals SELDsig applied to the gates of the selection transistors $SELD_0$ and $SELD_1$ of the dummy cells 11D2 and 11D3 are raised to High level in a pulse form. Due to this, the differential amplifier circuit in which the inverting input (-input) and the output are short-circuited is formed, so that it is possible to prevent a situation such that the floating diffusion $FD_i$ of the unit pixel $11_i$ as the inverting input of the differential pair is boosted and current balance of the differential pair collapses.

Thereafter, at the timing t35, the selection control signals SELDsig of the dummy cells 11D2 and 11D3 are caused to fall and the selection control signals $SELsig_R$ and $SELsig_i$ of the reference pixel 11R and the unit pixel $11_i$ are raised, a voltage level appearing in the vertical signal line $VSL0_k$ is read out by the column read-out circuit unit 14 as the signal level (D phase: pixel signal) during the period from the timing t35 to the timing t36, and the read out signal level is AD-converted by the column signal processing unit 15.

A digital value of the reset level (P phase) is then subtracted from a digital value of the signal level (D phase) in the column signal processing unit 15 or a peripheral circuit such as the signal processing unit 17 to perform CDS processing of acquiring a digital value of a signal component corresponding to an amount of received light of the photodiode $PD_i$.

Subsequently, in a period (from the timing t36 to the timing t41) in which the signal level is read out by causing the unit pixel $11_{i+1}$ in the (i+1)-th row to be the signal pixel 11A, similarly to the period (from the timing t11 to the timing t16) in which the signal level is read out by causing the unit pixel $11_i$ in the i-th row to be the signal pixel 11A, the differential amplifier circuit including the pair of dummy cells 11D2 and 11D3, the current mirror circuit 141, and the tail current source unit 142 is formed by causing the selection transistors $SELD_0$ and $SELD_1$ of the dummy cells 11D2 and 11D3 to be in the ON state in the period from the timing t36 to the timing t37 in which all of the unit pixels 11 in the effective pixel region 10V are caused to be in the non-selected state.

In a period from the timing t37 to the timing t38, the reset transistors $RST_R$ and $RST_{i+1}$ of the reference pixel 11R and the unit pixel $11_{i+1}$ as the signal pixel 11A are caused to be in the ON state, the floating diffusion $FD_R$ and the floating diffusion $FD_{i+1}$ are reset, and a reset level appearing in the vertical signal line $VSL1_k$ is read out and AD-converted in a period from the timing t38 to the timing t39.

Thereafter, in a period from the timing t39 to the timing t40, the differential amplifier circuit in which the inverting input (-input) and the output are short-circuited is formed by causing the transfer transistor $TRG_{i+1}$ to be in the ON state, transferring the electric charge of the photodiode $PD_{i+1}$ to the floating diffusion $FD_{i+1}$, and causing the selection transistors $SELD_0$ and $SELD_1$ of the dummy cells 11D2 and 11D3 to be in the ON state, so that it is possible to prevent a situation such that the floating diffusion $FD_{i+1}$ of the unit pixel $11_{i+1}$ as the inverting input of the differential pair is boosted and current balance of the differential pair collapses.

In a period from the timing t40 to the timing t41, a signal level appearing in the vertical signal line $VSL1_k$ is read out and AD-converted.

Thereafter, a digital value of the reset level (P phase) is subtracted from a digital value of the signal level (D phase) in the column signal processing unit 15 or a peripheral circuit such as the signal processing unit 17 to perform CDS processing of acquiring a digital value of a signal component corresponding to an amount of received light of the photodiode PD.

3.4 Function and Effect

As described above, according to the present embodiment, similarly to the first embodiment, during a period (a period from the timing t31 to the timing t32, and from the timing t36 to the timing t37 in FIG. 16) in which all of the unit pixels 11 in the effective pixel region 10V are caused to be in the non-selected state, the differential amplifier circuit in which the inverting input (-input) and the output are short-circuited is formed by the amplification transistors $AMPD_0$ and $AMPD_1$ of the dummy cells 11D2 and 11D3, the current mirror circuit 141, and the tail current source unit 142, and current consumption is maintained, so that the power supply voltage VDD and a drop amount of ground voltage can be maintained. Due to this, the settling time of the vertical signal lines $VSL0_k$ and $VSL1_k$ can be prevented from being prolonged.

In a transfer period (a period from the timing t34 to the timing t35, and from the timing t39 to the timing t40 in FIG. 16) in which the electric charge is transferred from the photodiode PD to the floating diffusion FD, the vertical signal line VSL is separated from the unit pixel 11, and the voltage level of the vertical signal line VSL is maintained at the reset level, so that it is possible to prevent a situation such that a large amplitude is generated in the vertical signal line VSL by feedthrough caused by capacitive coupling of the transfer transistor TRG and the floating diffusion FD, and the settling time of the vertical signal line VSL can be prevented from being prolonged accordingly.

Other configurations, operations (including driving), and effects may be the same as those in the embodiment described above, so that detailed description thereof will not be repeated herein.

3.5 Modification

Figure 17:
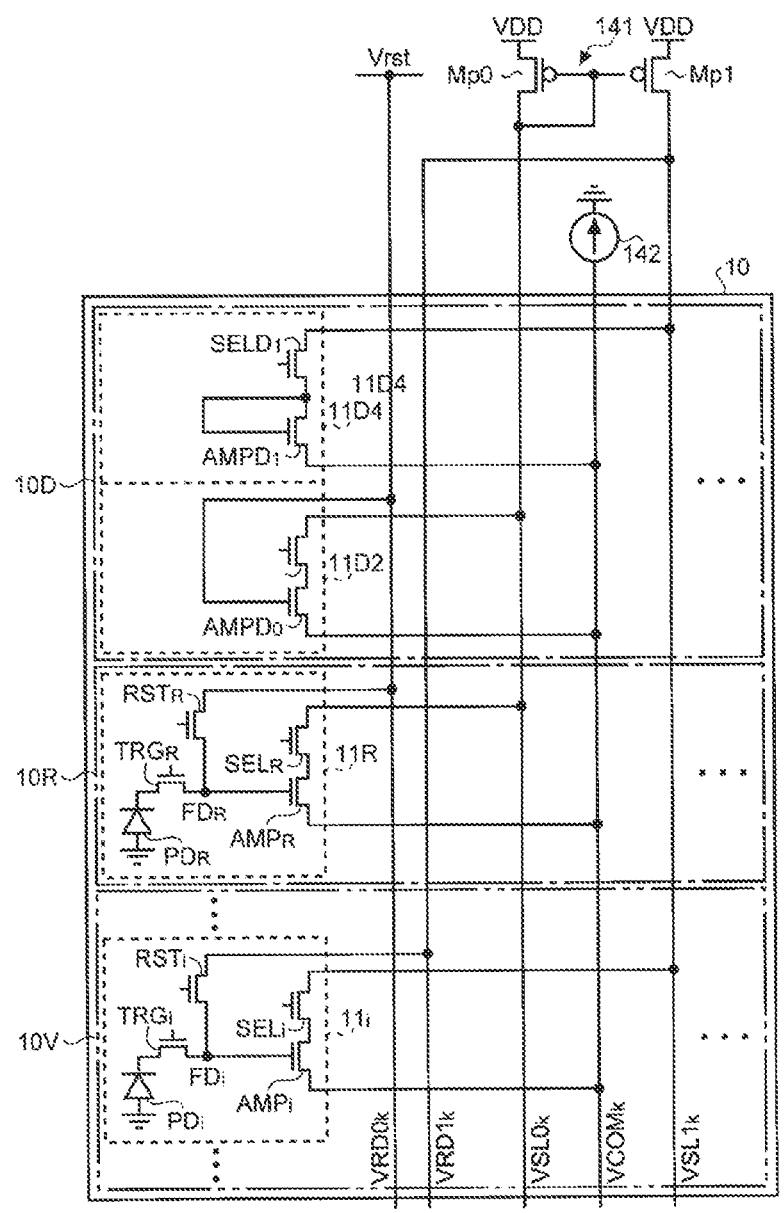
FIG. 17 is a circuit diagram illustrating a schematic configuration example of a differential-type amplification read-out configuration and a peripheral circuit thereof according to a modification of the second embodiment.

Subsequently, the following describes a modification of the second embodiment. FIG. 17 is a circuit diagram illustrating a schematic configuration example of the differential-type amplification read-out configuration and the peripheral circuit thereof according to the modification of the present embodiment.

As illustrated in FIG. 17, the dummy cell 11D3 corresponding to the signal pixel 11A of the pair of dummy cells 11D2 and 11D3 described above with reference to FIG. 15 in the second embodiment may be replaced with a dummy cell 11D4 in which the gate of the amplification transistor $AMPD_1$ is connected to the drain of the amplification transistor $AMPD_1$. In other words, a dummy differential pair formed of a pair of dummy cells 11D2 and 11D4 may have a configuration in which the inverting input (-input) and the output are short-circuited.

With such a configuration, the same effect as that of the second embodiment described above can be exhibited. Other configurations, operations (including driving), and effects may be the same as those in the embodiment described above, so that detailed description thereof will not be repeated herein.

4. Third Embodiment

Next, the following describes the solid-state imaging device and the electronic apparatus according to a third embodiment in detail with reference to the drawings. In the following description, redundant description about the same configurations and operations as those in the embodiments described above will not be repeated by reference.

The embodiments described above exemplify a case of disposing the pair of dummy cells 11D0 and 11D1, or 11D2 and 11D3/11D4 forming the dummy differential pair in the dummy differential pair formation region 10D. However, the configuration of the dummy differential pair is not limited to the configuration using the amplification transistors $AMPD_0$ and $AMPD_1$ of the pair of dummy cells 11D0 and 11D1, or 11D2 and 11D3/11D4. For example, in a case of fixing the reference pixel 11R to the unit pixel 11 in the reference-only row as described in the second embodiment, the dummy differential pair can be formed by using the reference pixel 11R in place of the dummy cell 11D2 corresponding to the reference pixel 11R of the two dummy cells 11D2 and 11D3 forming the dummy differential pair.

Figure 18:
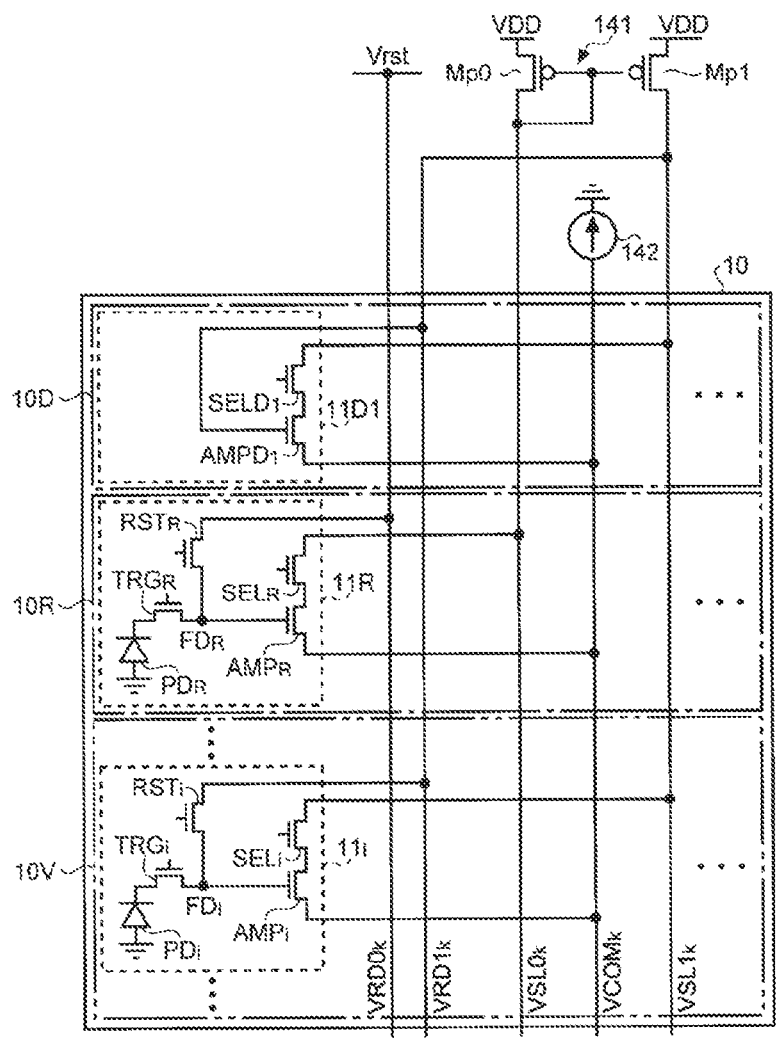
FIG. 18 is a circuit diagram illustrating a schematic configuration example of a differential-type amplification read-out configuration and a peripheral circuit thereof according to a third embodiment.

4.1 Example of Peripheral Circuit of Differential-Type Amplification Read-Out Configuration FIG. 18 is a circuit diagram illustrating a schematic configuration example of the differential-type amplification read-out configuration and a peripheral circuit thereof according to the present embodiment. The differential-type amplification read-out configuration in FIG. 18 has the same configuration as the differential-type amplification read-out configuration exemplified in FIG. 14 in the second embodiment. However, in FIG. 18, by way of example, the reference pixel 11R in FIG. 14 is caused to be the unit pixel 11 in the reference pixel region 10R outside the effective pixel region 10V, and the signal pixel 11A is caused to be the unit pixel $11_i$ in the effective pixel region 10V.

As illustrated in FIG. 18, the differential-type amplification read-out configuration and the peripheral circuit thereof according to the present embodiment have the same configuration as that of the differential-type amplification read-out configuration and the peripheral circuit thereof exemplified in FIG. 15 in the second embodiment except that the dummy cell 11D0 corresponding to the reference pixel in the dummy differential pair formation region 10D is omitted.

In this configuration, the dummy differential pair is constituted of the amplification transistor $AMPD_1$ of the dummy cell 11D3 and the amplification transistor $AMP_R$ of the reference pixel 11R.

4.2 Driving Example at Time of Differential-Type Amplification Read-Out (Switching Between Read-Out Pixel and Reference Pixel)

Subsequently, the following describes a driving example at the time of differential-type amplification read-out. The following description is based on the differential-type amplification read-out configuration illustrated in FIG. 18.

Figure 19:
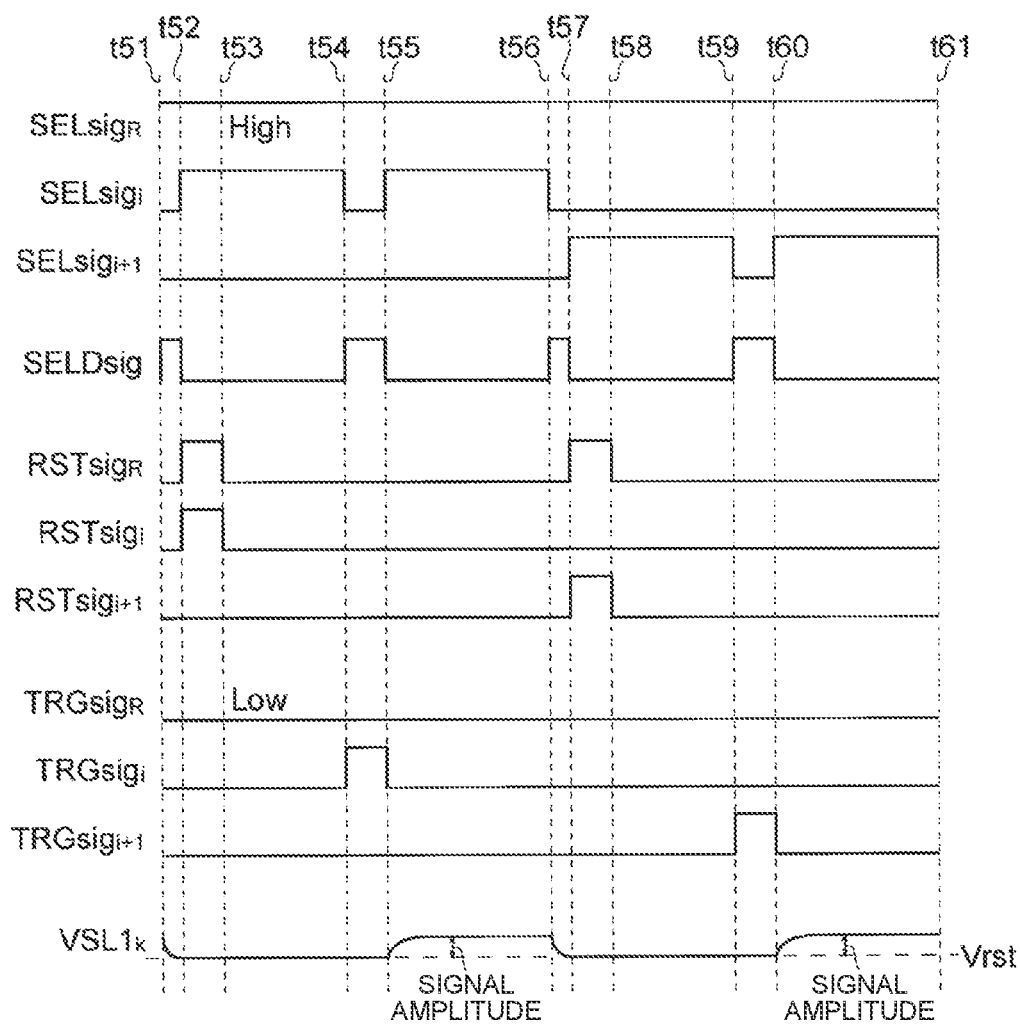
FIG. 19 is a timing chart illustrating a driving example at the time of differential-type amplification read-out according to the third embodiment.

FIG. 19 is a timing chart illustrating a driving example at the time of differential-type amplification read-out according to the present embodiment. In the driving example illustrated in FIG. 19, the unit pixel $11_i$ in the i-th row is caused to be the signal pixel 11A from the timing t51 to the timing t56, and the unit pixel $11_{i+1}$ in the (i+1)-th row is caused to be the signal pixel 11A from the timing t56 to the timing t61.

As illustrated in FIG. 19, in driving at the time of differential-type amplification read-out according to the present embodiment, the selection control signal $SELsig_R$ input to the gate of the selection transistor $SEL_R$ of the reference pixel 11R is kept at High level at all times in driving similar to the driving example that is described above with reference to FIG. 16 in the second embodiment. Due to this, the reference pixel 11R is caused to be in a selected state at all times.

4.3 Function and Effect

As described above, according to the present embodiment, by causing the reference pixel 11R to be in the selected state at all times, the differential amplifier circuit in which the inverting input (-input) and the output are short-circuited is formed by the amplification transistor $AMPD_1$ of the dummy cell 11D3, the amplification transistor $AMP_R$ of the reference pixel 11R, the current mirror circuit 141, and the tail current source unit 142, and current consumption is maintained during a period (a period from the timing t51 to t52, and from the timing t56 to the timing t57 in FIG. 19) in which all of the unit pixels 11 in the effective pixel region 10V are caused to be in the non-selected state, so that the power supply voltage VDD and the drop amount of ground voltage can be maintained. Accordingly, the settling time of the vertical signal lines $VSL0_k$ and $VSL1_k$ can be prevented from being prolonged.

In a transfer period (a period from the timing t54 to the timing t55, and from the timing t59 to the timing t60 in FIG. 19) in which the electric charge is transferred from the photodiode PD to the floating diffusion FD, the vertical signal line VSL is separated from the unit pixel 11, and the voltage level of the vertical signal line VSL is maintained at the reset level, so that it is possible to prevent a situation such that a large amplitude is generated in the vertical signal line VSL by feedthrough caused by capacitive coupling of the transfer transistor TRG and the floating diffusion FD, and the settling time of the vertical signal line VSL can be prevented from being prolonged accordingly.

Other configurations, operations (including driving), and effects may be the same as those in the embodiments described above, so that detailed description thereof will not be repeated herein.

4.4 Modification

Figure 20:
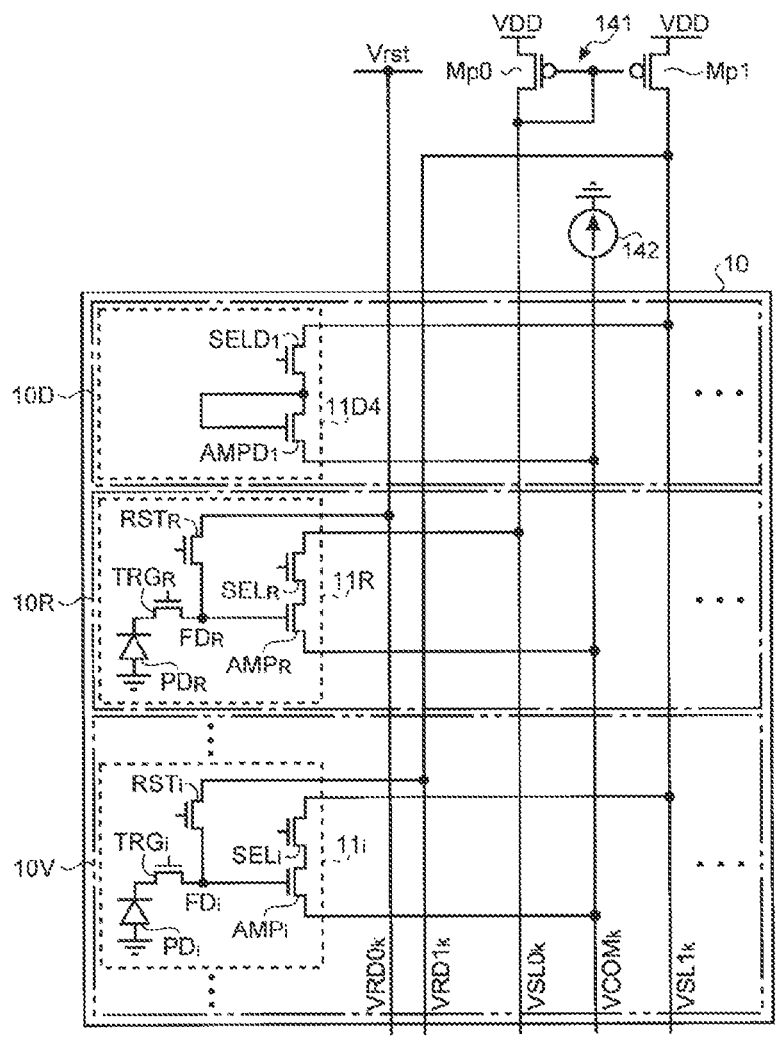
FIG. 20 is a circuit diagram illustrating a schematic configuration example of a differential-type amplification read-out configuration and a peripheral circuit thereof according to a modification of the third embodiment.

Subsequently, the following describes a modification of the third embodiment. FIG. 20 is a circuit diagram illustrating a schematic configuration example of the differential-type amplification read-out configuration and the peripheral circuit thereof according to the modification of the present embodiment.

As illustrated in FIG. 20, the dummy cell 11D3 corresponding to the signal pixel 11A described above with reference to FIG. 18 in the third embodiment may be replaced with the dummy cell 11D4 in which the gate of the amplification transistor $AMPD_1$ is connected to the drain of the amplification transistor $AMPD_1$ like the modification of the second embodiment described above with reference to FIG. 17. In other words, the dummy differential pair formed of the dummy cell 11D4 and the reference pixel 11R may have a configuration in which the inverting input (-input) and the output are short-circuited.

With such a configuration, the same effect as that in the third embodiment described above can be exhibited. Other configurations, operations (including driving), and effects may be the same as those in the embodiment described above, so that detailed description thereof will not be repeated herein.

5. Fourth Embodiment

Next, the following describes the solid-state imaging device and the electronic apparatus according to the fourth embodiment in detail with reference to the drawings. In the following description, redundant description about the same configurations and operations as those in the embodiment described above will not be repeated by reference.

Figure 21:
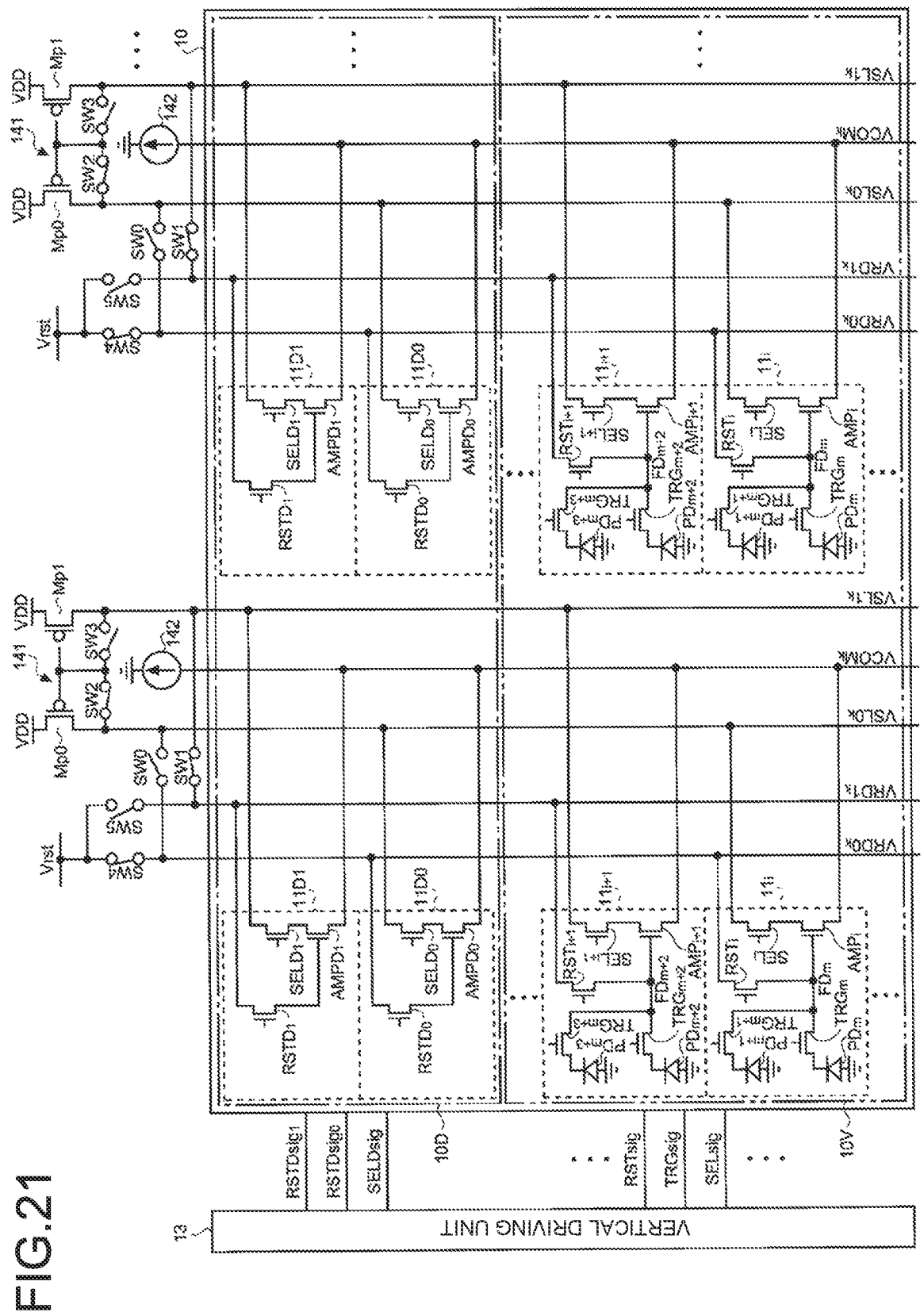
FIG. 21 is a circuit diagram illustrating a schematic configuration example of a differential-type amplification read-out configuration and a peripheral circuit thereof according to a fourth embodiment.

5.1 Example of Peripheral Circuit of Differential-Type Amplification Read-Out Configuration FIG. 21 is a circuit diagram illustrating a schematic configuration example of the differential-type amplification read-out configuration and the peripheral circuit thereof according to the present embodiment. As illustrated in FIG. 21, in the present embodiment, for example, in the same configuration as that exemplified in FIG. 10, each of the unit pixels 11 in the effective pixel region 11V has a configuration in which a plurality of (in FIG. 21, two) photodiodes PD share one floating diffusion FD. The transfer transistor TRG is individually disposed between each of the photodiodes PD and the floating diffusion FD.

For example, in the unit pixel $11_i$ in FIG. 21, a photodiode $PD_m$ is connected to the floating diffusion $FD_i$ via a transfer transistor $TRG_m$, and a photodiode $PD_{m+1}$ is connected to the floating diffusion $FD_i$ via a transfer transistor $TRG_{m+1}$. Similarly, in the unit pixel $11_{i+1}$, a photodiode $PD_{m+2}$ is connected to the floating diffusion $FD_{i+1}$ via a transfer transistor $TRG_{m+2}$, and a photodiode $PD_{m+3}$ is connected to the floating diffusion $FD_{i+1}$ via a transfer transistor $TRG_{m+3}$.

In this way, even in a case in which each unit pixel 11 in the effective pixel region 10V has the configuration in which the photodiodes PD share one floating diffusion FD, the dummy cells 11D0 and 11D1 in the dummy differential pair formation region 10D may have the same configuration as that exemplified in FIG. 10.

The present embodiment exemplifies a case based on the differential-type amplification read-out configuration and the configuration of the peripheral circuit thereof described above with reference to FIG. 10 in the first embodiment, but the embodiment is not limited thereto. The embodiment may be based on the configuration described above with reference to FIG. 15 in the second embodiment or the modification thereof (refer to FIG. 17), the configuration described above with reference to FIG. 18 in the third embodiment or the modification thereof (refer to FIG. 20), and the like.

Other configurations, operations (including driving), and effects may be the same as those in the embodiments described above, so that detailed description thereof will not be repeated herein.

6. Fifth Embodiment

Next, the following describes the solid-state imaging device and the electronic apparatus according to the fifth embodiment in detail with reference to the drawings. In the following description, redundant description about the same configurations and operations as those in the embodiment described above will not be repeated by reference.

The embodiments described above exemplify a case in which the dummy differential pair formation region 10D is disposed in the pixel array unit 10. However, a disposition place of the dummy differential pair formation region 10D is not limited to the inside of the pixel array unit 10, and may be variously modified such that the dummy differential pair formation region 10D is disposed in the peripheral circuit such as the column read-out circuit unit 14, for example.

6.1 System Configuration Example of CMOS Image Sensor

Figure 22:
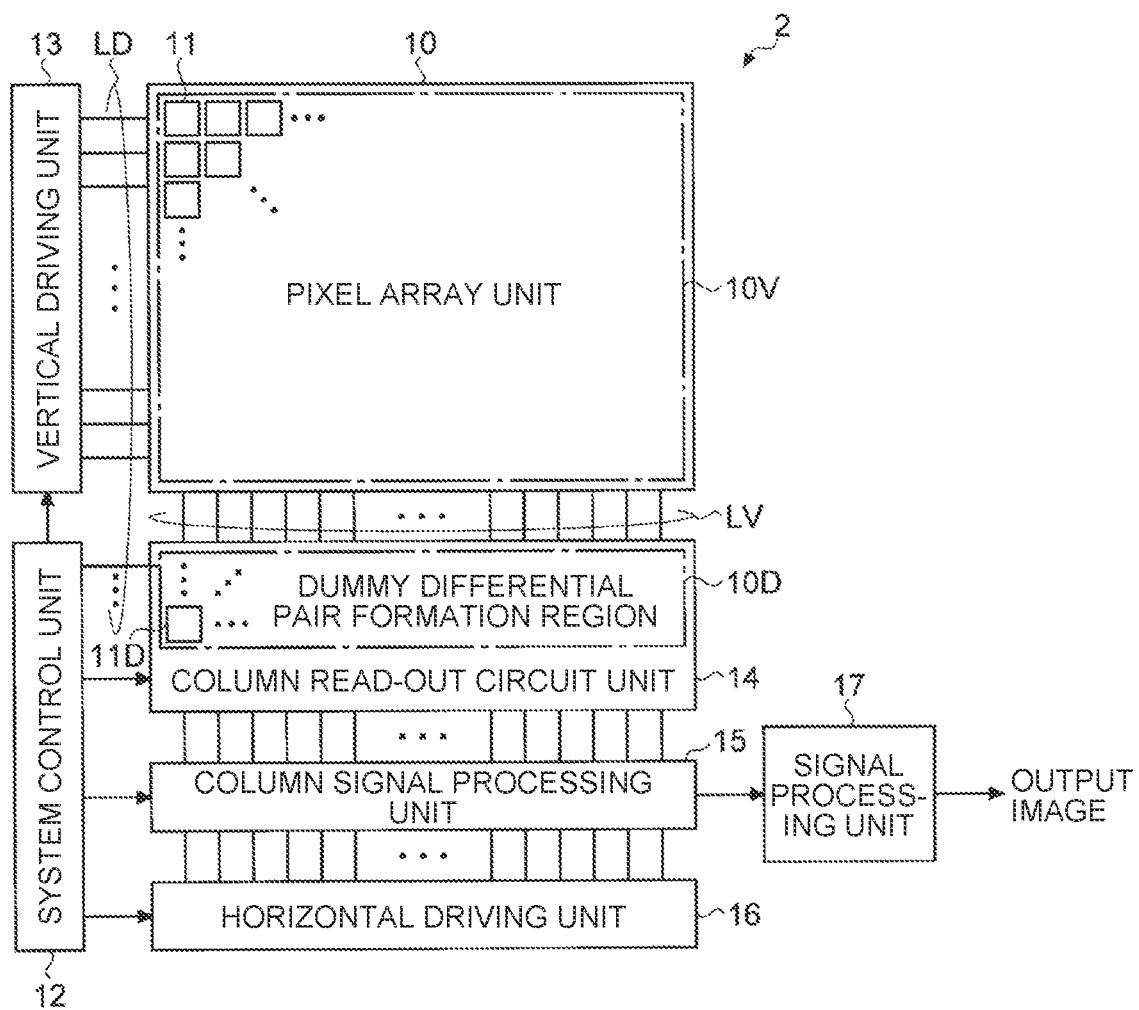
FIG. 22 is a system configuration diagram illustrating a schematic configuration example of a CMOS image sensor as a solid-state imaging device mounted on an electronic apparatus according to a fifth embodiment.

FIG. 22 is a system configuration diagram illustrating a schematic configuration example of the CMOS image sensor as the solid-state imaging device mounted on the electronic apparatus according to the present embodiment. As illustrated in FIG. 22, for example, a CMOS image sensor 2 according to the present embodiment has the same configuration as that of the CMOS image sensor 1 described above with reference to FIG. 6 in the first embodiment except that the dummy differential pair formation region 10D is disposed in the column read-out circuit unit 14.

Figure 23:
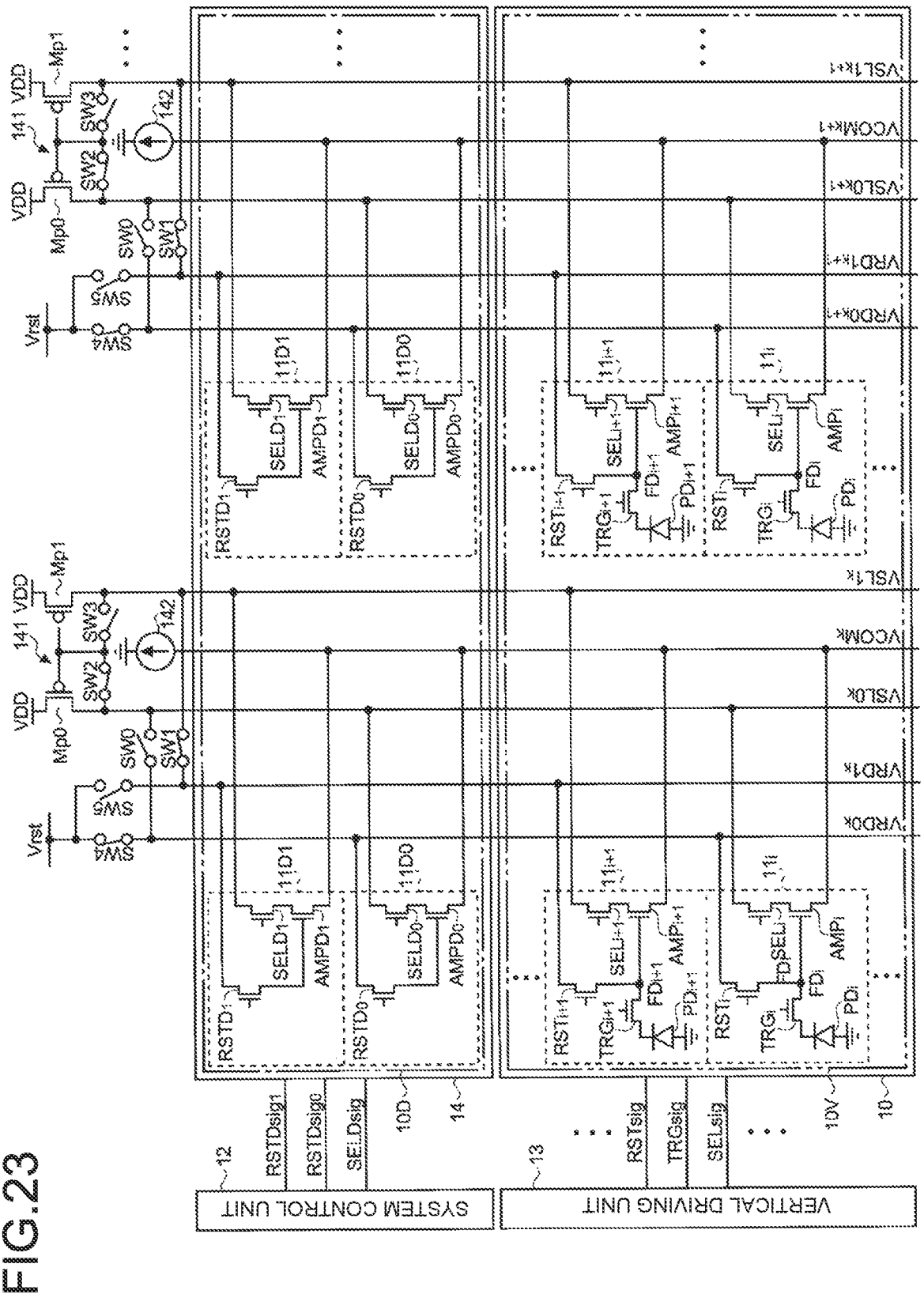
FIG. 23 is a circuit diagram illustrating a schematic configuration example of a differential-type amplification read-out configuration and a peripheral circuit thereof according to the fifth embodiment.

6.2 Example of Peripheral Circuit of Differential-Type Amplification Read-Out Configuration FIG. 23 is a circuit diagram illustrating a schematic configuration example of the differential-type amplification read-out configuration and the peripheral circuit thereof according to the present embodiment. As illustrated in FIG. 23, in the present embodiment, for example, in the same configuration as that exemplified in FIG. 10, the system control unit 12 supplies the selection control signal SELDsig and the reset signals RSTDsig0 and RSTDsig1 to the dummy cells 11D0 and 11D1 in the dummy differential pair formation region 10D disposed in the column read-out circuit unit 14.

In this way, the disposition place of the dummy differential pair formation region 10D is not limited to the inside of the pixel array unit 10, which is the same as that of the effective pixel region 10V, and can be variously modified. The present embodiment exemplifies a case based on the first embodiment, but the embodiment is not limited thereto. The embodiment can be based on the second embodiment or the modification thereof, the third embodiment or the modification thereof, and the like.

7. Additional Notes 7.1 Cross-Sectional Structure Example of Unit Pixel

Next, the following describes a cross-sectional structure of the unit pixel 11 according to the embodiments described above with several examples.

7.1.1 First Example

A first example describes a cross-sectional structure of the unit pixel 11 of surface irradiation type using examples. In the present description, the surface irradiation type is assumed to be a structure in which an element forming surface on a semiconductor substrate is assumed to be a surface, and light is incident on the photodiode PD from this surface side.

Figure 24A:
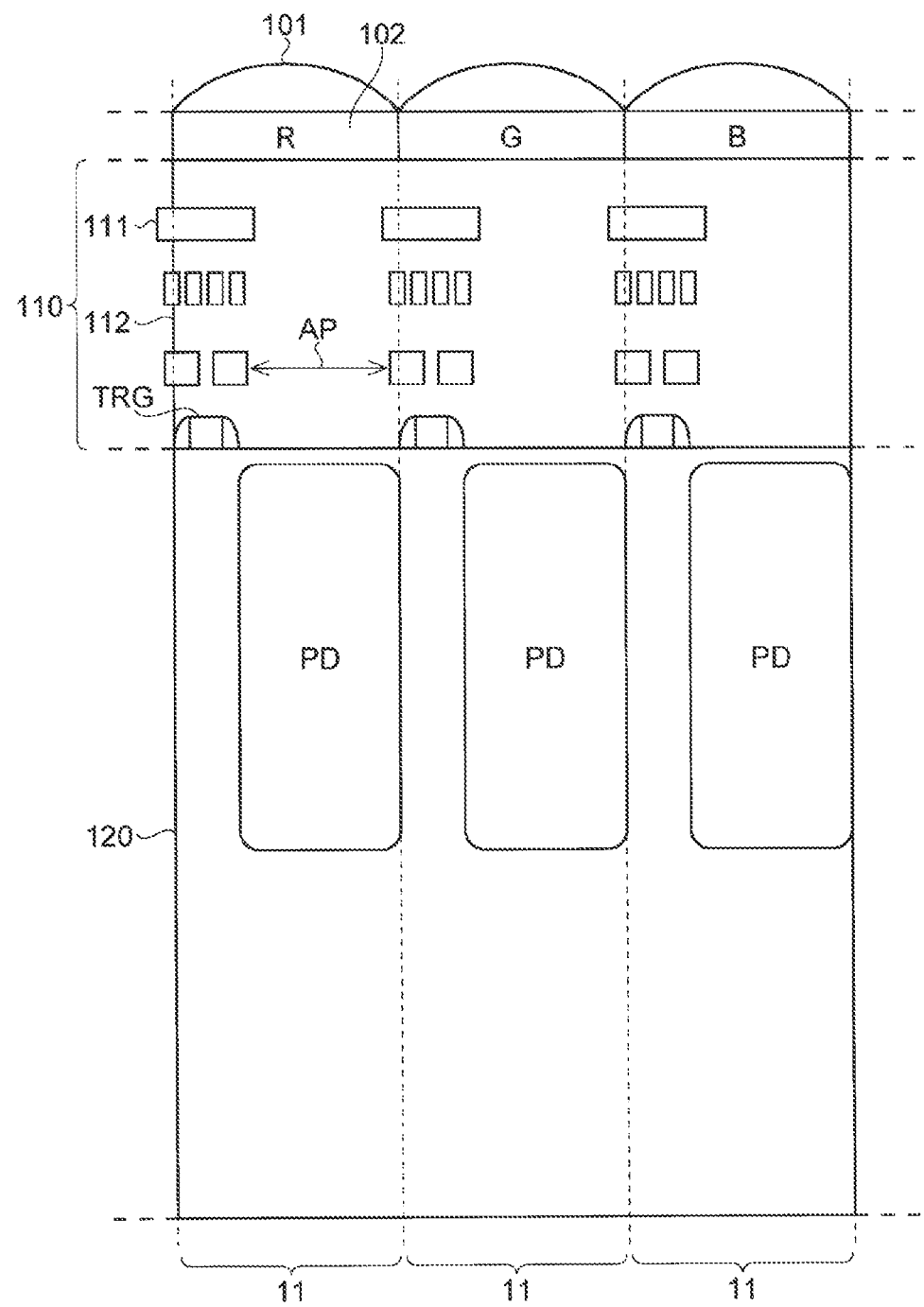
FIG. 24A is a cross-sectional view illustrating a cross-sectional structure example of a unit pixel according to a first example of the embodiment.

FIG. 24A is a cross-sectional view illustrating a cross-sectional structure example of the unit pixel according to the first example. In FIG. 24A, an upper side is assumed to be a surface (also referred to as an upper surface). FIG. 24A illustrates a cross section of a surface perpendicular to the surface.

As illustrated in FIG. 24A, the unit pixel 11 of surface irradiation type includes a semiconductor substrate 120 and a wiring layer 110 disposed on an upper surface of the semiconductor substrate 120. In the vicinity of the upper surface of the semiconductor substrate 120, the photodiodes PD that are two-dimensionally arranged in a matrix are formed.

The wiring layer 110 has a structure in which an insulating film 112 such as a silicone oxide film covers the transfer transistor TRG that is electrically connected to each of the photodiodes PD on the semiconductor substrate 120, wiring 111 that connects the transfer transistor TRG to the other pixel transistor (such as the reset transistor RST, the amplification transistor AMP, and the selection transistor SEL), and the like. The transfer transistor TRG and the wiring 111 are disposed at positions shifted from an upper side of the photodiode PD, and a light receiving unit opening area AP through which light is incident on the photodiode PD is disposed on the upper side of the photodiode PD accordingly.

On a flattened upper surface of the wiring layer 110, a color filter 102 that selectively transmits light having a specific wavelength and an on-chip lens 101 that collects incident light to the photodiode PD are disposed for each of the unit pixels 11.

Although not illustrated, in a region other than a formation region of the photodiode PD on the semiconductor substrate 120 and/or the wiring layer 110 corresponding to this region, the pixel transistor other than the transfer transistor TRG (such as the reset transistor RST, the amplification transistor AMP, and the selection transistor SEL), the column read-out circuit unit 14, the column signal processing unit 15, other peripheral circuits, or the like may be disposed.

This surface irradiation type is advantageous in facilitating design and lowering production costs, for example.

7.1.2 Second Example

A second example describes a cross-sectional structure of the unit pixel 11 of back surface irradiation type using examples. In the present description, the back surface irradiation type is assumed to be a structure in which an opposite side of the element forming surface on the semiconductor substrate is assumed to be a back surface, and light is incident on the photodiode PD from this back surface side.

Figure 24B:
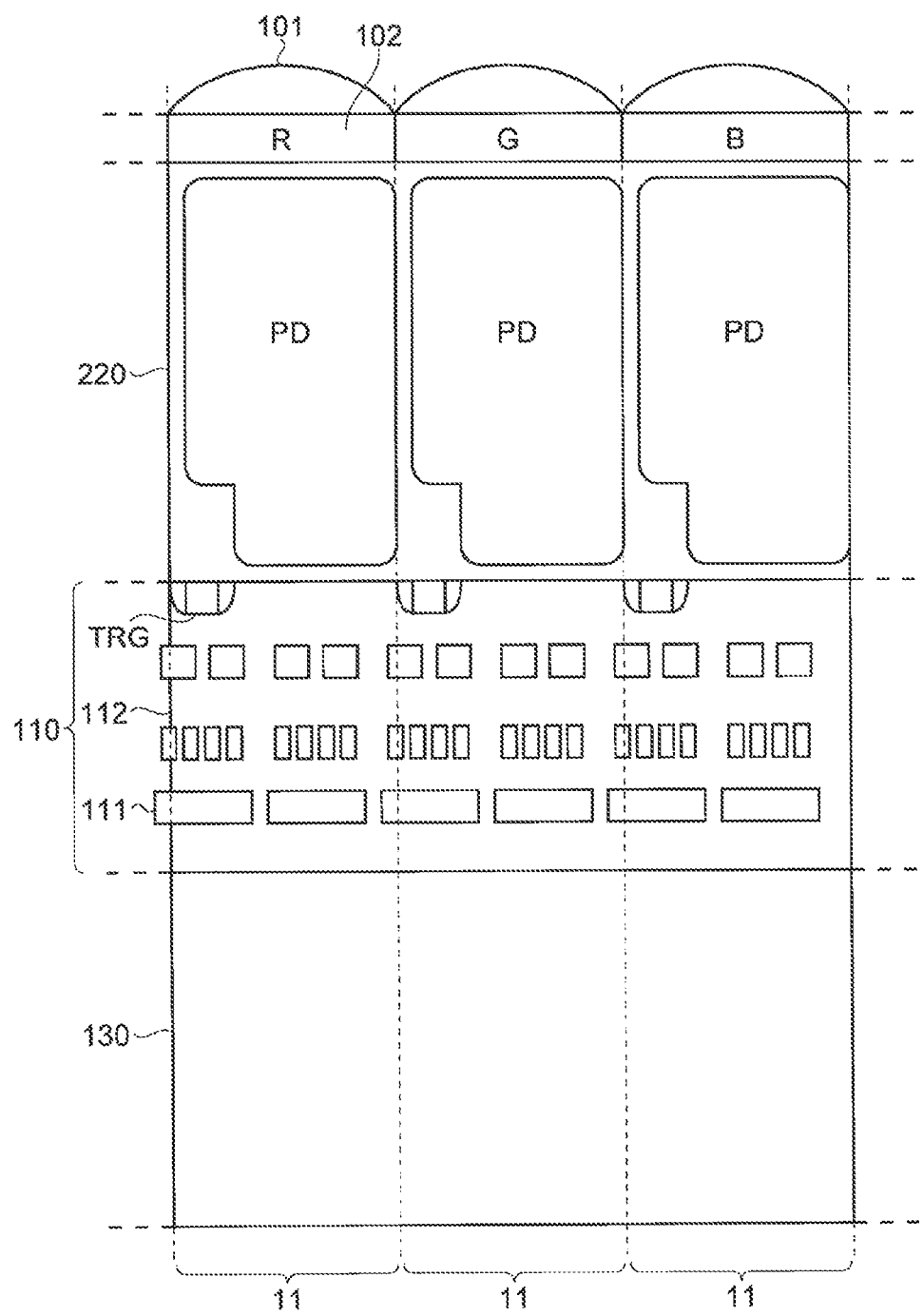
FIG. 24B is a cross-sectional view illustrating a cross-sectional structure example of a unit pixel according to a second example of the embodiment.

FIG. 24B is a cross-sectional view illustrating a cross-sectional structure example of the unit pixel according to the second example. In FIG. 24B, an upper side is assumed to be a back surface. FIG. 24B illustrates a cross section of a surface perpendicular to the back surface.

As illustrated in FIG. 24B, the unit pixel 11 of back surface irradiation type includes a semiconductor substrate 220, the wiring layer 110 disposed on a surface side of the semiconductor substrate 220, and a support substrate 130 disposed on the upper surface of the wiring layer 110.

In the vicinity of a surface of the semiconductor substrate 220, similarly to the semiconductor substrate 120 illustrated in FIG. 24A, the photodiodes PD that are two-dimensionally arranged in a matrix are formed. However, the semiconductor substrate 220 is shaven by Chemical Mechanical Polishing (CMP) and the like from the back surface side to be thinned so that the photodiode PD is also positioned in the vicinity of the back surface.

Similarly to the wiring layer 110 illustrated in FIG. 24A, the wiring layer 110 has a structure in which the insulating film 112 covers the transfer transistor TRG, the wiring 111, and the like. However, in a case of the back surface irradiation type, the light receiving opening AP through which light is incident on the photodiode PD is not necessarily disposed in the wiring layer 110.

On the flattened back surface of the semiconductor substrate 220, the color filter 102 that selectively transmits light having a specific wavelength and the on-chip lens 101 that collects incident light to the photodiode PD are disposed for each of the unit pixels 11.

The support substrate 130 is joined to the flattened upper surface of the wiring layer 110. The support substrate 130 may be, for example, a semiconductor substrate such as a silicon substrate. On the support substrate 130, for example, the pixel transistor other than the transfer transistor TRG (such as the reset transistor RST, the amplification transistor AMP, and the selection transistor SEL), the column read-out circuit unit 14, the column signal processing unit 15, other peripheral circuits, or the like may be formed.

In this way, by causing the unit pixel 11 to have the pixel structure of back surface irradiation type, the opening through which light is incident on the photodiode PD can be made larger than that of the surface irradiation type. Accordingly, pixel characteristics such as sensitivity and full well capacity can be improved.

7.2 Structure Example of CMOS Image Sensor

Next, the following describes a structure of the CMOS image sensor according to the embodiments described above with several examples.

7.2.1 First Example

Figure 25A:
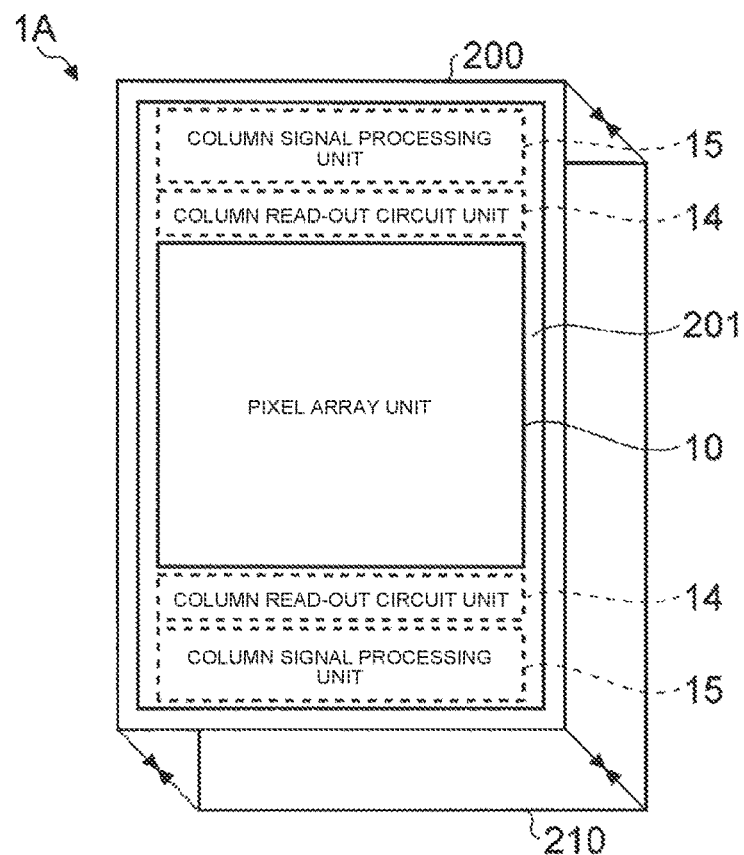
FIG. 25A is a schematic diagram illustrating a schematic structure example of the CMOS image sensor according to the first example of the embodiment.

FIG. 25A is a schematic diagram illustrating a schematic structure example of the CMOS image sensor according to the first example. As illustrated in FIG. 25A, a CMOS image sensor 1A according to the first example has a laminated structure in which a semiconductor substrate 200 is joined to a support substrate 210.

On the semiconductor substrate 200, the pixel array unit 10, the column read-out circuit unit 14, the column signal processing unit 15, another peripheral circuit 201 (such as the system control unit 12, the vertical driving unit 13, the horizontal driving unit 16, the signal processing unit 17, the pixel driving line LD, and the vertical pixel wiring LV) are disposed. Each of the unit pixels 11 in the pixel array unit 10 may be, for example, the surface irradiation type illustrated in FIG. 24A, or the back surface irradiation type illustrated in FIG. 24B.

The support substrate 210 is a member for enhancing strength of the CMOS image sensor 1A, and may be various substrates including, for example, a semiconductor substrate such as a silicon substrate, an insulating substrate such as a ceramic substrate, and the like. In a case in which each of the unit pixels 11 in the pixel array unit 10 is the surface irradiation type, the support substrate 210 is not necessarily disposed.

7.2.2 Second Example

Figure 25B:
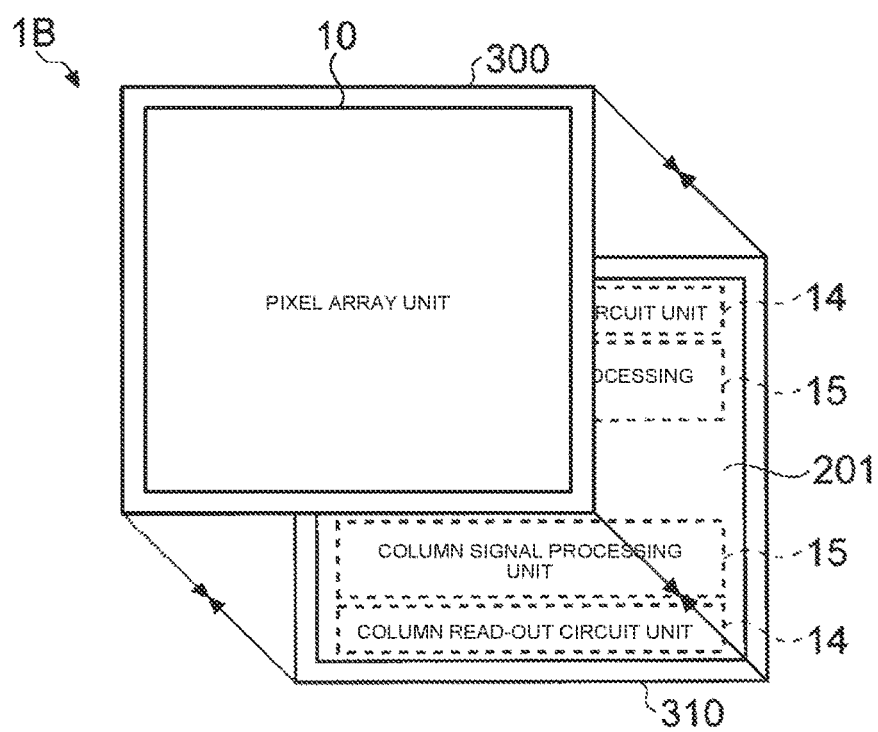
FIG. 25B is a schematic diagram illustrating a schematic structure example of the CMOS image sensor according to the second example of the embodiment.

FIG. 25B is a schematic diagram illustrating a schematic structure example of the CMOS image sensor according to a second example. As illustrated in FIG. 25B, a CMOS image sensor 1B according to the second example has a laminated structure in which, for example, a first semiconductor substrate 300 and a second semiconductor substrate 310 are joined to each other by plasma joining, Cu—Cu bonding, and the like.

For example, the pixel array unit 10 is disposed on the first semiconductor substrate 300. On the other hand, on the second semiconductor substrate 310, the column read-out circuit unit 14, the column signal processing unit 15, and the other peripheral circuit 201 are disposed. Each of the unit pixels 11 in the pixel array unit 10 may be, for example, the surface irradiation type illustrated in FIG. 24A, or the back surface irradiation type illustrated in FIG. 24B.

In this way, by making a laminated configuration by disposing the configurations other than the pixel array unit 10 on the second semiconductor substrate 310 different from the first semiconductor substrate 300 on which the pixel array unit 10 is disposed, the CMOS image sensor 1B can be downsized. Additionally, the pixel array unit 10 and the other circuit configurations can be formed through separate production processes, so that reduction in production costs, improvement in performance, and the like can be easily achieved.

The embodiments of the present disclosure have been described above, but a technical scope of the present disclosure is not limited to the embodiments described above as it is, and can be variously modified without departing from the gist of the present disclosure. The constituent elements throughout the different embodiments and modifications may be combined with each other as appropriate.

The effects of the respective embodiments described herein are merely examples, and the effects are not limited thereto. Other effects may be exhibited.

The present technique may employ the configurations as described below.

(1)

A solid-state imaging device comprising:
a first vertical signal line and a second vertical signal line;
a current mirror circuit connected to the first and the second vertical signal lines;
a first unit pixel connected to the first vertical signal line;
a second unit pixel connected to the second vertical signal line;
a first unit cell connected to the first vertical signal line;
a second unit cell connected to the second vertical signal line;
a current supply line connected to the first and the second unit pixels and the first and the second unit cells; and
a constant current circuit connected to the current supply line, wherein
a first amplification transistor of the first unit pixel, a second amplification transistor of the second unit pixel, the current mirror circuit, and the constant current circuit constitute a first differential amplifier circuit, and
a third amplification transistor of the first unit cell, a fourth amplification transistor of the second unit cell, the current mirror circuit, and the constant current circuit constitute a second differential amplifier circuit.

(2)

The solid-state imaging device according to (1), wherein each of the first and the second unit cells does not include a photoelectric conversion element that photoelectrically converts incident light.

(3)

The solid-state imaging device according to (1), wherein, in the second differential amplifier circuit, a gate of the fourth amplification transistor constituting an inverting input and a drain of the fourth amplification transistor constituting an output are short-circuited.

(4) The solid-state imaging device according to any one of (1) to (3), comprising:
a plurality of the first unit pixels, and a plurality of the second unit pixels, wherein
the first and the second unit pixels are two-dimensionally arranged in a matrix,
the first and the second unit pixels are alternately arranged in a column direction, and
the second differential amplifier circuit is configured by causing a selection transistor of the first unit cell and a selection transistor of the second unit cell to be in an ON state at the time of switching a unit pixel to be read out from a certain first unit pixel to a second unit pixel adjacent to the first unit pixel, or from a certain second unit pixel to a first unit pixel adjacent to the second unit pixel.

(5) The solid-state imaging device according to any one of (1) to (3), comprising:
a plurality of the first unit pixels, and a plurality of the second unit pixels, wherein
the first and the second unit pixels are two-dimensionally arranged in a matrix,
the first unit pixel is positioned in a predetermined reference-only row in the arrangement of the first and the second unit pixels, and
the second differential amplifier circuit is configured by causing a selection transistor of the first unit cell and a selection transistor of the second unit cell to be in an ON state at the time of switching a unit pixel to be read out from a certain second unit pixel to another second unit pixel adjacent to the second unit pixel.

(6) The solid-state imaging device according to any one of (1) to (5), wherein
each of the first and the second unit pixels comprises:
a photoelectric conversion element configured to photoelectrically converts incident light;
a transfer transistor configured to transfer an electric charge generated in the photoelectric conversion element; and
a charge accumulation unit configured to accumulate the electric charge transferred by the transfer transistor, and
the second differential amplifier circuit is configured by causing a selection transistor of the first unit cell and a selection transistor of the second unit cell to be in an ON state at the time of transferring the electric charge generated in the photoelectric conversion element to the charge accumulation unit via the transfer transistor.

(7) The solid-state imaging device according to any one of (1) to (4), wherein
the first unit pixel comprises:
a first photoelectric conversion element configured to photoelectrically convert incident light;
a first transfer transistor configured to transfer an electric charge generated in the first photoelectric conversion element;
a first charge accumulation unit configured to accumulate the electric charge transferred by the first transfer transistor;
a first reset transistor in which a source is connected to the first charge accumulation unit, the first reset transistor being configured to discharge the electric charge accumulated in the first charge accumulation unit;
the first amplification transistor in which a drain is connected to the first vertical signal line and a source is connected to the current supply line, the first amplification transistor being configured to cause a voltage corresponding to the electric charge accumulated in the first charge accumulation unit to appear in the first vertical signal line; and
a first selection transistor configured to switch connection between the drain of the first amplification transistor and the first vertical signal line, and
the second unit pixel comprises:
a second photoelectric conversion element configured to photoelectrically convert incident light;
a second transfer transistor configured to transfer an electric charge generated in the second photoelectric conversion element;
a second charge accumulation unit configured to accumulate the electric charge transferred by the second transfer transistor;
a second reset transistor in which a source is connected to the second charge accumulation unit, the second reset transistor being configured to discharge the electric charge accumulated in the second charge accumulation unit;
the second amplification transistor in which a drain is connected to the second vertical signal line and a source is connected to the current supply line, the second amplification transistor being configured to cause a voltage corresponding to the electric charge accumulated in the second charge accumulation unit to appear in the second vertical signal line; and
a second selection transistor configured to switch connection between the second amplification transistor and the second vertical signal line.

(8) The solid-state imaging device according to (7), further comprising:
a first reset input line connected to a drain of the first reset transistor,
a second reset input line connected to a drain of the second reset transistor;
a first switch configured to switch connection between the first vertical signal line and the first reset input line; and
a second switch configured to switch connection between the second vertical signal line and the second reset input line.

(9) The solid-state imaging device according to any one of (1) to (4), wherein
the first unit cell comprises:
the third amplification transistor in which a source is connected to the current supply line; and
a third selection transistor in which a source is connected to a drain of the third amplification transistor, and a drain is connected to the first vertical signal line, and
the second unit cell comprises:
the fourth amplification transistor in which a source is connected to the current supply line; and
a fourth selection transistor in which a source is connected to a drain of the fourth amplification transistor, and a drain is connected to the second vertical signal line.

(10)
The solid-state imaging device according to (9), wherein the first unit cell further comprises a third reset transistor in which a source is connected to a gate of the third amplification transistor, and
the second unit cell further comprises a fourth reset transistor in which a source is connected to a gate of the fourth amplification transistor.

(11)
The solid-state imaging device according to (10), further comprising:
a first reset input line connected to a drain of the third reset transistor;
a second reset input line connected to a drain of the fourth reset transistor;
a first switch configured to switch connection between the first vertical signal line and the first reset input line; and
a second switch configured to switch connection between the second vertical signal line and the second reset input line.

(12)
The solid-state imaging device according to (9), further comprising:
a first reset input line connected to a gate of the third amplification transistor; and
a second reset input line connected to a gate of the fourth amplification transistor.

(13)
The solid-state imaging device according to (9), further comprising:
a first reset input line connected to a gate of the third amplification transistor, wherein
a gate of the fourth amplification transistor is connected to the drain of the fourth amplification transistor and the source of the fourth selection transistor.

(14)
The solid-state imaging device according to (12) or (13), further comprising:
a plurality of unit pixels including the first and the second unit pixels, wherein
the unit pixels are two-dimensionally arranged in a matrix, and
the first unit pixel is positioned in a predetermined reference-only row in the arrangement of the unit pixels.

(15)
The solid-state imaging device according to any one of (1) to (14), further comprising:
a pixel array unit; and
a peripheral circuit connected to the pixel array unit via the first and the second vertical signal lines, wherein
the pixel array unit includes:
a first region in which a plurality of unit pixels including the first and the second unit pixels are two-dimensionally arranged in a matrix; and
a second region in which a plurality of unit cells including the first and the second unit cells are arranged in a row and/or column shape.

(16)
The solid-state imaging device according to any one of (1) to (14), further comprising:
a pixel array unit; and
a peripheral circuit connected to the pixel array unit via the first and the second vertical signal lines, wherein
the pixel array unit includes a first region in which a plurality of unit pixels including the first and the second unit pixels are two-dimensionally arranged in a matrix, and the peripheral circuit includes a second region in which a plurality of unit cells including the first and the second unit cells are arranged in a row and/or column shape.

(17)
The solid-state imaging device according to (16), wherein the peripheral circuit is a read-out circuit unit configured to read out a pixel signal from the first or the second unit pixel via the first or the second vertical signal line.

(18)
The solid-state imaging device according to any one of (15) to (17), comprising:
a first chip that comprises the pixel array unit; and
a second chip that is joined to the first chip, and comprises the peripheral circuit.

19. A solid-state imaging device comprising:
a first vertical signal line and a second vertical signal line;
a current mirror circuit connected to the first and the second vertical signal lines;
a reference pixel connected to the first vertical signal line;
a unit pixel connected to the second vertical signal line;
a unit cell connected to the second vertical signal line;
a current supply line connected to the unit pixel, the reference pixel, and the unit cell; and
a constant current circuit connected to the current supply line, wherein
a first amplification transistor of the reference pixel, a second amplification transistor of the unit pixel, the current mirror circuit, and the constant current circuit constitute a first differential amplifier circuit, and
the first amplification transistor of the reference pixel, a third amplification transistor of the unit cell, the current mirror circuit, and the constant current circuit constitute a second differential amplifier circuit.

(20)
An electronic apparatus comprising:
a first vertical signal line and a second vertical signal line;
a current mirror circuit connected to the first and the second vertical signal lines;
a first unit pixel connected to the first vertical signal line;
a second unit pixel connected to the second vertical signal line;
a first unit cell connected to the first vertical signal line;
a second unit cell connected to the second vertical signal line;
a current supply line connected to the first and the second unit pixels and the first and the second unit cells;
a constant current circuit connected to the current supply line; and
a conversion unit that is connected to the first and the second vertical signal lines, and configured to convert an analog voltage appearing in the first vertical signal line or the second vertical signal line into a digital voltage value, wherein
a first amplification transistor of the first unit pixel, a second amplification transistor of the second unit pixel, the current mirror circuit, and the constant current circuit constitute a first differential amplifier circuit, and
a third amplification transistor of the first unit cell, a fourth amplification transistor of the second unit cell, the current mirror circuit, and the constant current circuit constitute a second differential amplifier circuit.

(21)
An electronic apparatus including:
a first vertical signal line and a second vertical signal line;
a current mirror circuit connected to the first and the second vertical signal lines;
a reference pixel connected to the first vertical signal line;
a unit pixel connected to the second vertical signal line;
a unit cell connected to the second vertical signal line;
a current supply line connected to the unit pixel, the reference pixel, and the unit cell;
a constant current circuit connected to the current supply line; and
a conversion unit connected to the second vertical signal line, and configured to convert an analog voltage appearing in the second vertical signal line into a digital voltage value, wherein
a first amplification transistor of the reference pixel, a second amplification transistor of the unit pixel, the current mirror circuit, and the constant current circuit constitute a first differential amplifier circuit, and
the first amplification transistor of the reference pixel, a third amplification transistor of the unit cell, the current mirror circuit, and the constant current circuit constitute a second differential amplifier circuit.

REFERENCE SIGNS LIST 1, 1A, 1B, 2 CMOS IMAGE SENSOR
10 PIXEL ARRAY UNIT
10V EFFECTIVE PIXEL REGION
10D DUMMY DIFFERENTIAL PAIR FORMATION REGION
10R REFERENCE PIXEL REGION
11 UNIT PIXEL
11A SIGNAL PIXEL
11B, 11R REFERENCE PIXEL
11D, 11D0 to 11D4 DUMMY CELL
12 SYSTEM CONTROL UNIT
13 VERTICAL DRIVING UNIT
14 COLUMN READ-OUT CIRCUIT UNIT
15 COLUMN SIGNAL PROCESSING UNIT
16 HORIZONTAL DRIVING UNIT
17 SIGNAL PROCESSING UNIT
20 ADC
101 ON-CHIP LENS
102 COLOR FILTER
110 WIRING LAYER
111 WIRING
112 INSULATING FILM
120, 220, 200 SEMICONDUCTOR SUBSTRATE
130, 210 SUPPORT SUBSTRATE
141 CURRENT MIRROR CIRCUIT
142 TAIL CURRENT SOURCE UNIT
201 PERIPHERAL CIRCUIT
300 FIRST SEMICONDUCTOR SUBSTRATE
310 SECOND SEMICONDUCTOR SUBSTRATE
AMP, AMPD AMPLIFICATION TRANSISTOR
AP LIGHT RECEIVING UNIT OPENING AREA
FD FLOATING DIFFUSION
LD PIXEL DRIVING LINE
LV VERTICAL PIXEL WIRING
Lrst RESET TRANSISTOR DRIVING LINE
Lsel SELECTION TRANSISTOR DRIVING LINE
Ltrg TRANSFER TRANSISTOR DRIVING LINE
Mp0, Mp1 PMOS TRANSISTOR
PD PHOTODIODE
RST, RSTD RESET TRANSISTOR
SEL, SELD SELECTION TRANSISTOR
SW, SW0 to SW5 SWITCH
TRG TRANSFER TRANSISTOR
VCOM VERTICAL CURRENT SUPPLY LINE
VRD VERTICAL RESET INPUT LINE
VSL, VSL0, VSL1 VERTICAL SIGNAL LINE

The invention claimed is:
1. A solid-state imaging device comprising:
a first vertical signal line and a second vertical signal line;
a current mirror circuit connected to the first vertical signal line and the second vertical signal line;
a first unit pixel connected to the first vertical signal line;
a second unit pixel connected to the second vertical signal line;
a first unit cell connected to the first vertical signal line;
a second unit cell connected to the second vertical signal line;
a current supply line connected to the first unit pixel, the second unit pixel, the first unit cell, and the second unit cell; and
a constant current circuit connected to the current supply line, wherein
a first amplification transistor of the first unit pixel, a second amplification transistor of the second unit pixel, the current mirror circuit, and the constant current circuit constitute a first differential amplifier circuit, and
a third amplification transistor of the first unit cell, a fourth amplification transistor of the second unit cell, the current mirror circuit, and the constant current circuit constitute a second differential amplifier circuit.
2. The solid-state imaging device according to claim 1, wherein each of the first unit cell and the second unit cell does not include a photoelectric conversion element that photoelectrically converts incident light.
3. The solid-state imaging device according to claim 1, wherein, in the second differential amplifier circuit, a gate of the fourth amplification transistor constituting an inverting input and a drain of the fourth amplification transistor constituting an output are short-circuited.
4. The solid-state imaging device according to claim 1, further comprising:
a plurality of first unit pixels; and
a plurality of second unit pixels, wherein
the plurality of first unit pixels and the plurality of second unit pixels are two-dimensionally arranged in a matrix,
the plurality of first unit pixels and the plurality of second unit pixels are alternately arranged in a column direction,
the second differential amplifier circuit is configured to cause selection transistor of the first unit cell and a selection transistor of the second unit cell to be in an ON state at a time of switch of a unit pixel to be read out from one of a certain first unit pixel of the plurality of first unit pixels to a certain second unit pixel of the plurality of second unit pixels or from the certain second unit pixel to the certain first unit pixel, and
the certain first unit pixel is adjacent to the certain second unit pixel.
5. The solid-state imaging device according to claim 1, further comprising:
a plurality of first unit pixels; and
a plurality of second unit pixels, wherein the plurality of first unit pixels and the plurality of second unit pixels are two-dimensionally arranged in a matrix, the first unit pixel is positioned in a predetermined reference-only row in the plurality of first unit pixels and the plurality of second unit pixels, and the second differential amplifier circuit is configured to cause a selection transistor of the first unit cell and a selection transistor of the second unit cell to be in an ON state at a time of switch of a unit pixel to be read out from a certain second unit pixel to another second unit pixel adjacent to the certain second unit pixel.

6. The solid-state imaging device according to claim 1, wherein each of the first unit pixel and the second unit pixel comprises:

a photoelectric conversion element configured to photoelectrically convert incident light;

a transfer transistor configured to transfer an electric charge generated in the photoelectric conversion element; and a charge accumulation unit configured to accumulate the electric charge transferred by the transfer transistor, wherein the second differential amplifier circuit is configured to cause a selection transistor of the first unit cell and a selection transistor of the second unit cell to be in an ON state at a time of transfer of the electric charge generated in the photoelectric conversion element to the charge accumulation unit via the transfer transistor.

7. The solid-state imaging device according to claim 1, wherein the first unit pixel comprises:

a first photoelectric conversion element configured to photoelectrically convert incident light;

a first transfer transistor configured to transfer an electric charge generated in the first photoelectric conversion element;

a first charge accumulation unit configured to accumulate the electric charge transferred by the first transfer transistor;

a first reset transistor in which a source is connected to the first charge accumulation unit, wherein the first reset transistor is configured to discharge the electric charge accumulated in the first charge accumulation unit;

the first amplification transistor in which a drain is connected to the first vertical signal line and a source is connected to the current supply line, wherein the first amplification transistor is configured to cause a voltage corresponding to the electric charge accumulated in the first charge accumulation unit to appear in the first vertical signal line; and a first selection transistor configured to switch a connection between the drain of the first amplification transistor and the first vertical signal line, and the second unit pixel comprises:

a second photoelectric conversion element configured to photoelectrically convert the incident light;

a second transfer transistor configured to transfer an electric charge generated in the second photoelectric conversion element;

a second charge accumulation unit configured to accumulate the electric charge transferred by the second transfer transistor;

a second reset transistor in which a source is connected to the second charge accumulation unit, wherein the second reset transistor is configured to discharge the electric charge accumulated in the second charge accumulation unit;

the second amplification transistor in which a drain is connected to the second vertical signal line and a source is connected to the current supply line, wherein the second amplification transistor is configured to cause a voltage corresponding to the electric charge accumulated in the second charge accumulation unit to appear in the second vertical signal line; and a second selection transistor configured to switch a connection between the second amplification transistor and the second vertical signal line.

8. The solid-state imaging device according to claim 7, further comprising:

a first reset input line connected to a drain of the first reset transistor;

a second reset input line connected to a drain of the second reset transistor;

a first switch configured to switch the connection between the first vertical signal line and the first reset input line; and a second switch configured to switch the connection between the second vertical signal line and the second reset input line.

9. The solid-state imaging device according to claim 1, wherein the first unit cell comprises:

the third amplification transistor in which a source is connected to the current supply line; and a third selection transistor in which a source is connected to a drain of the third amplification transistor, wherein the drain of the third amplification transistor is connected to the first vertical signal line, and the second unit cell comprises:

the fourth amplification transistor in which a source is connected to the current supply line; and a fourth selection transistor in which a source is connected to a drain of the fourth amplification transistor, wherein the drain of the fourth amplification transistor is connected to the second vertical signal line.

10. The solid-state imaging device according to claim 9, wherein the first unit cell further comprises a third reset transistor in which a source is connected to a gate of the third amplification transistor, and the second unit cell further comprises a fourth reset transistor in which a source is connected to a gate of the fourth amplification transistor.

11. The solid-state imaging device according to claim 10, further comprising:

a first reset input line connected to a drain of the third reset transistor;

a second reset input line connected to a drain of the fourth reset transistor;

a first switch configured to switch connection between the first vertical signal line and the first reset input line; and a second switch configured to switch a connection between the second vertical signal line and the second reset input line.

12. The solid-state imaging device according to claim 9, further comprising:

a first reset input line connected to a gate of the third amplification transistor; and a second reset input line connected to a gate of the fourth amplification transistor.

13. The solid-state imaging device according to claim 12, further comprising:
a plurality of unit pixels including the first unit pixel and the second unit pixel, wherein
the plurality of unit pixels is two-dimensionally arranged in a matrix, and
the first unit pixel is positioned in a predetermined reference-only row in the plurality of unit pixels.

14. The solid-state imaging device according to claim 9, wherein a gate of the fourth amplification transistor is connected to the drain of the fourth amplification transistor and the source of the fourth selection transistor.

15. The solid-state imaging device according to claim 1, further comprising:
a pixel array unit; and
a peripheral circuit connected to the pixel array unit via the first vertical signal line and the second vertical signal line, wherein the pixel array unit includes:
a first region in which a plurality of unit pixels including the first unit pixel and the second unit pixel are two-dimensionally arranged in a matrix; and
a second region in which a plurality of unit cells including the first unit cell and the second unit cell are arranged in at least one of a row or a column.

16. The solid-state imaging device according to claim 15, further comprising:
a first chip that comprises the pixel array unit; and
a second chip that is joined to the first chip, wherein the second chip comprises the peripheral circuit.

17. The solid-state imaging device according to claim 1, further comprising:
a pixel array unit; and
a peripheral circuit connected to the pixel array unit via the first vertical signal line and the second vertical signal line, wherein
the pixel array unit includes a first region in which a plurality of unit pixels including the first unit pixel and the second unit pixel are two-dimensionally arranged in a matrix, and
the peripheral circuit includes a second region in which a plurality of unit cells including the first unit cell and the second unit cell are arranged in at least one of a row or a column.

18. The solid-state imaging device according to claim 17, wherein the peripheral circuit is a read-out circuit unit configured to read out a pixel signal from one of the first unit pixel or the second unit pixel via one of the first vertical signal line or the second vertical signal line.

19. A solid-state imaging device, comprising:
a first vertical signal line and a second vertical signal line;
a current mirror circuit connected to the first and the second vertical signal lines;
a reference pixel connected to the first vertical signal line;
a unit pixel connected to the second vertical signal line;
a unit cell connected to the second vertical signal line;
a current supply line connected to the unit pixel, the reference pixel, and the unit cell; and
a constant current circuit connected to the current supply line, wherein
a first amplification transistor of the reference pixel, a second amplification transistor of the unit pixel, the current mirror circuit, and the constant current circuit constitute a first differential amplifier circuit, and
the first amplification transistor of the reference pixel, a third amplification transistor of the unit cell, the current mirror circuit, and the constant current circuit constitute a second differential amplifier circuit.

20. An electronic apparatus, comprising:
a first vertical signal line and a second vertical signal line;
a current mirror circuit connected to the first and the second vertical signal lines;
a first unit pixel connected to the first vertical signal line;
a second unit pixel connected to the second vertical signal line;
a first unit cell connected to the first vertical signal line;
a second unit cell connected to the second vertical signal line;
a current supply line connected to the first unit pixel, the second unit pixel, the first unit cell, and the second unit cell;
a constant current circuit connected to the current supply line; and
a conversion unit that is connected to the first and the second vertical signal lines, wherein
the conversion unit is configured to convert an analog voltage appearing in the first vertical signal line or the second vertical signal line into a digital voltage value, wherein
a first amplification transistor of the first unit pixel, a second amplification transistor of the second unit pixel, the current mirror circuit, and the constant current circuit constitute a first differential amplifier circuit, and
a third amplification transistor of the first unit cell, a fourth amplification transistor of the second unit cell, the current mirror circuit, and the constant current circuit constitute a second differential amplifier circuit.

* * * * *